US006643660B1

United States Patent
Miller et al.

(10) Patent No.: US 6,643,660 B1
(45) Date of Patent: Nov. 4, 2003

(54) TECHNIQUE FOR SPECIFYING THE PARAMETERS OF COMPLEX TECHNICAL STUDIES BY USING A DECISION TREE

(75) Inventors: James Arthur Miller, Los Angeles, CA (US); Dennis M. Lanfear, Topanga, CA (US)

(73) Assignee: Toxweb, Inc., Los Angeles, CA (US)

( * ) Notice: Subject to any disclaimer, the term of this patent is extended or adjusted under 35 U.S.C. 154(b) by 208 days.

(21) Appl. No.: 09/702,198

(22) Filed: Oct. 30, 2000

(51) Int. Cl.[7] .................... G06F 7/100; G06F 9/44; G06F 17/00
(52) U.S. Cl. .................. 707/100; 717/100; 706/45; 706/46; 706/47
(58) Field of Search .................. 707/1, 6–7, 100, 707/103 R, 514; 706/45–47; 717/100

(56) References Cited

U.S. PATENT DOCUMENTS

| | | |
|---|---|---|
| 5,272,623 A | 12/1993 | Grubb et al. |
| 5,692,206 A | 11/1997 | Shirley et al. |
| 5,710,887 A | 1/1998 | Chelliah et al. |
| 5,794,053 A | 8/1998 | Doris, Jr. et al. |
| 5,870,768 A * | 2/1999 | Hekmatpour ............... 706/45 |
| 5,905,974 A | 5/1999 | Fraser et al. |
| 6,012,045 A | 1/2000 | Barzilai et al. |
| 6,023,686 A | 2/2000 | Brown |
| 6,067,531 A | 5/2000 | Hoyt et al. |
| 6,442,748 B1 * | 8/2002 | Bowman-Amuah ...... 707/103 R |

OTHER PUBLICATIONS

Web page, Tox Prices Intro Page, welcome to Tox-Prices.com, A service of Huntingdon Life Sciences; p. 1, http://www.toxprices.com/hlsToxPrices_WelcomePage.html, downloaded Sep. 27, 2000.

Web page, Inceutica Press, inceutica.com, Jul. 23, 2000, NetMarket Review:Inceutica.com—Article by Jeff Pasternack, DynamicPM, pp. 1–2; .../press_article.asp?DocID=197&DocDate=July+23%2C+2000&DocName=NetMarket+Rev, downloaded Oct. 23, 2000.

Web page, Inceutica Press, inceutica.com, Aug. 16, 2000, Inceutica.com lands $4M first round—Article by .../press_article.asp?DocID=200&DocDate=August+16%2C+2000&DocName=Inceutica%2; downloaded Oct. 23, 2000.

* cited by examiner

*Primary Examiner*—Alford Kindred
(74) *Attorney, Agent, or Firm*—Sidley Austin Brown & Wood

(57) ABSTRACT

The present specification, discloses a method, apparatus, and article of manufacture for specifying the design and execution related parameters of a technical study by creating and using a decision tree. In accordance with an embodiment of the present invention, a decision tree is created that has interdependent decision nodes. One or more decision choices is associated with each interdependent decision nodes. The interdependent decision nodes are ordered in a hierarchical manner such. that a selection of one of the decision choices dynamically and functionally determines the manner in which a subsequent decision choice is affected. This embodiment of the present invention has utility for objectively defining study parameters and thereby substantially stream lining the design specification process for complex technical studies.

63 Claims, 25 Drawing Sheets

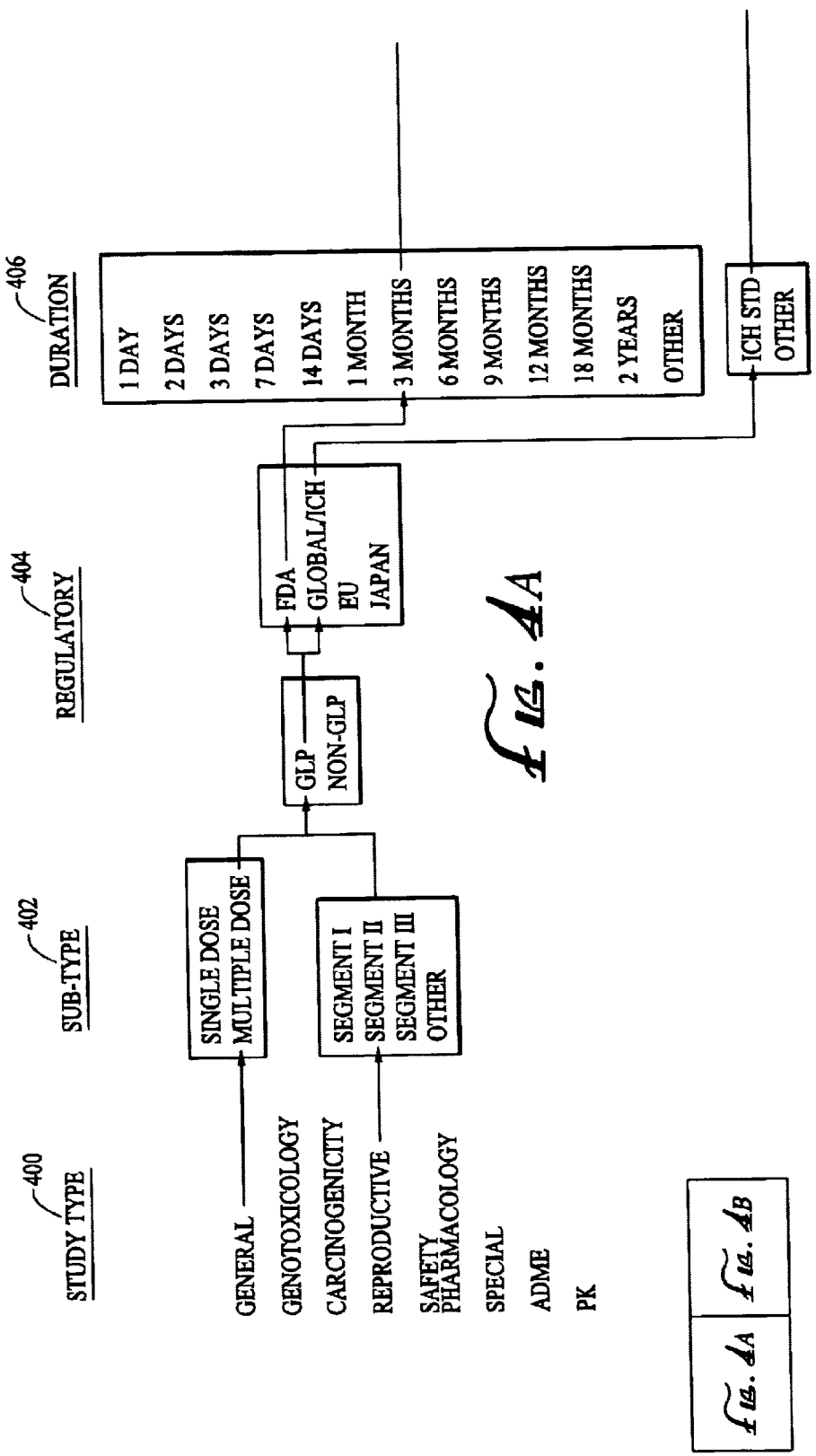

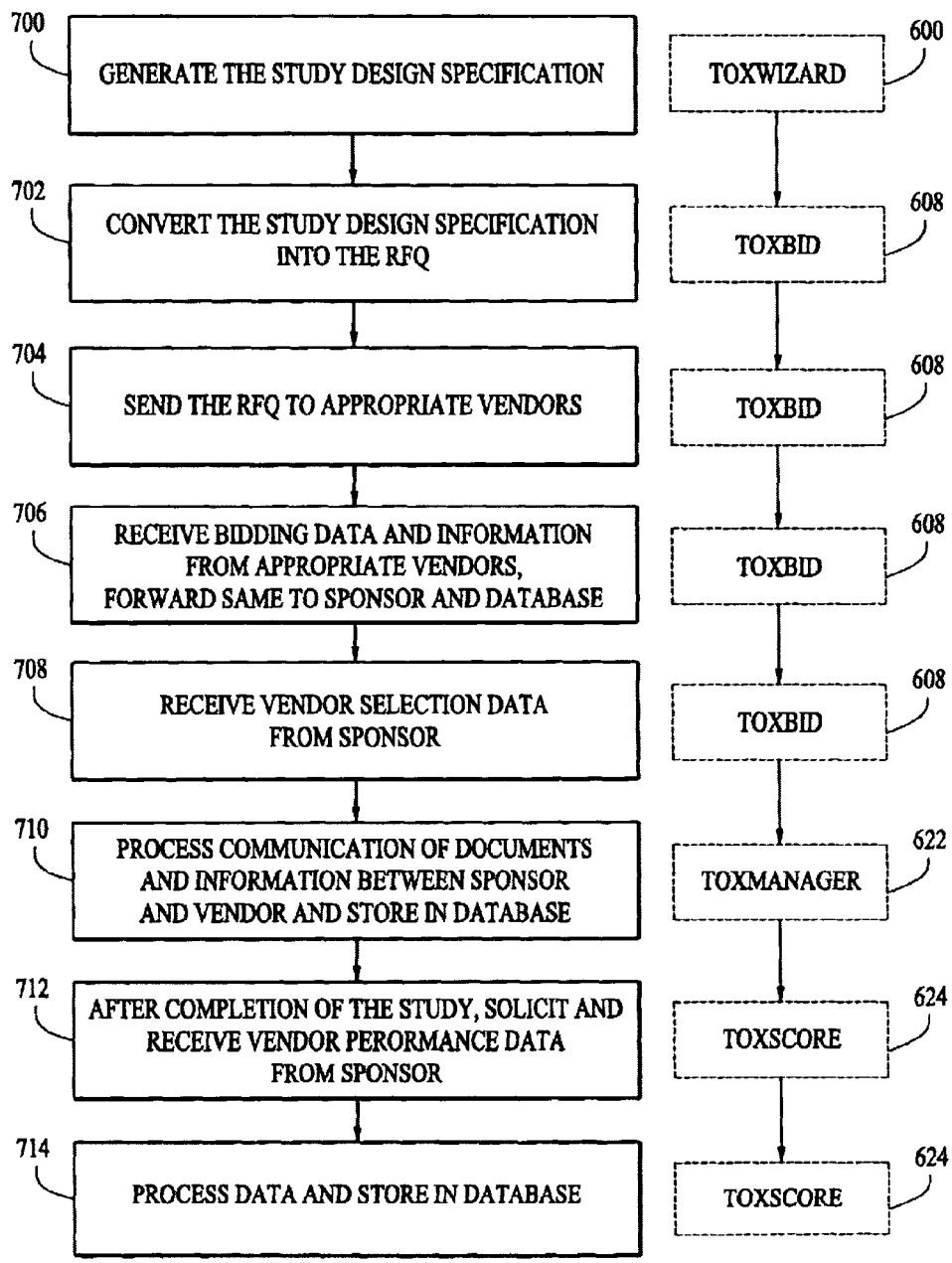

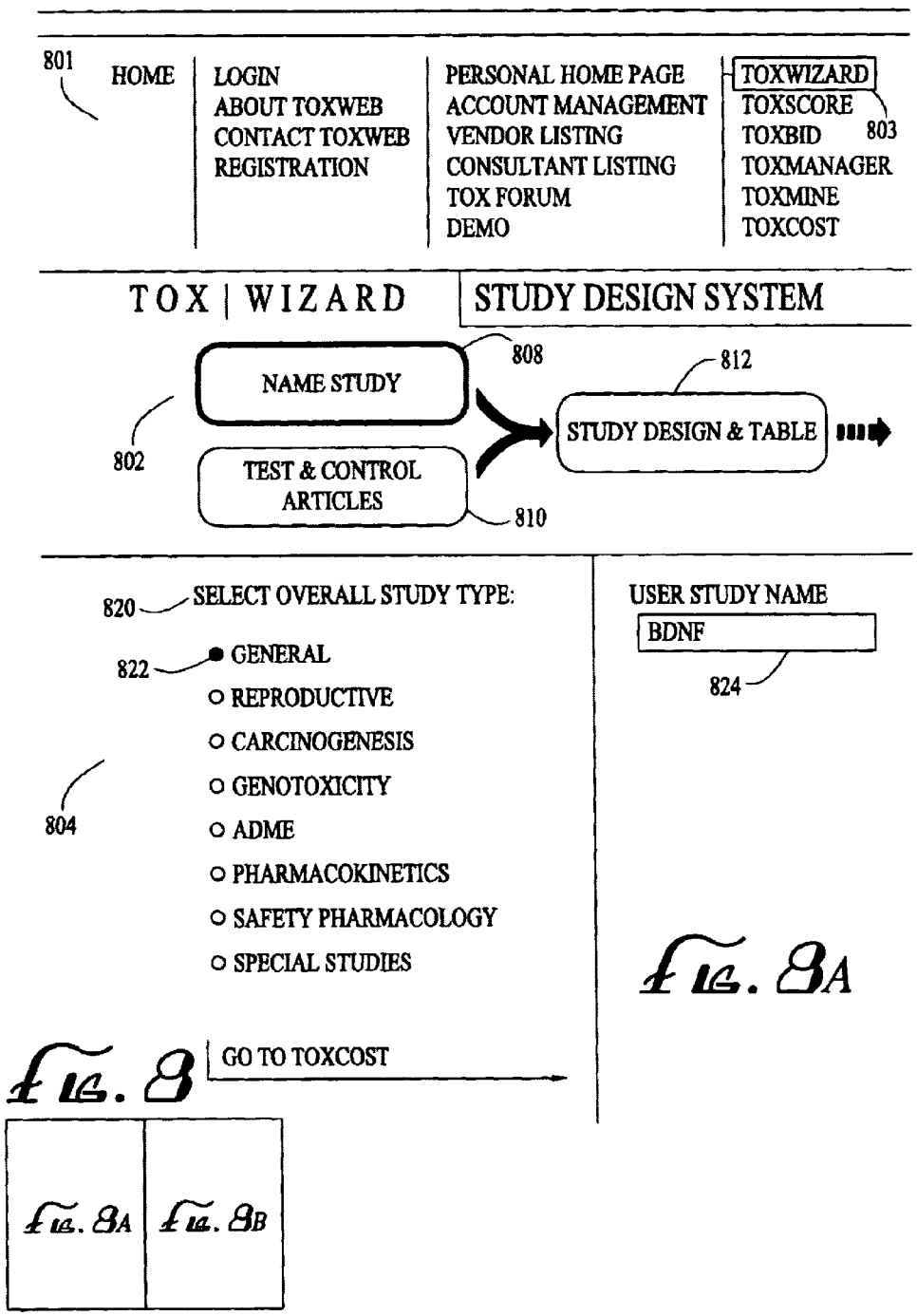

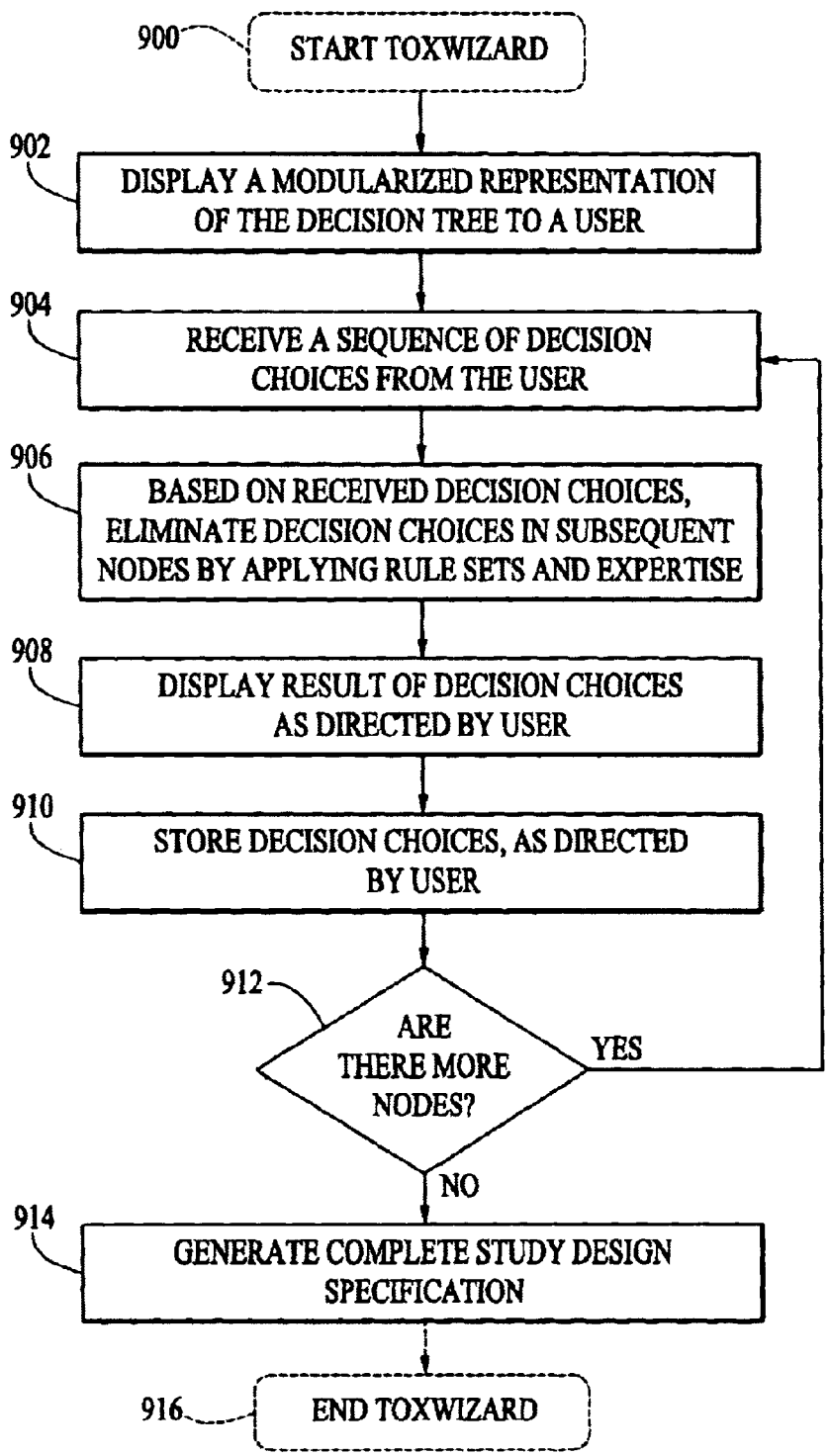

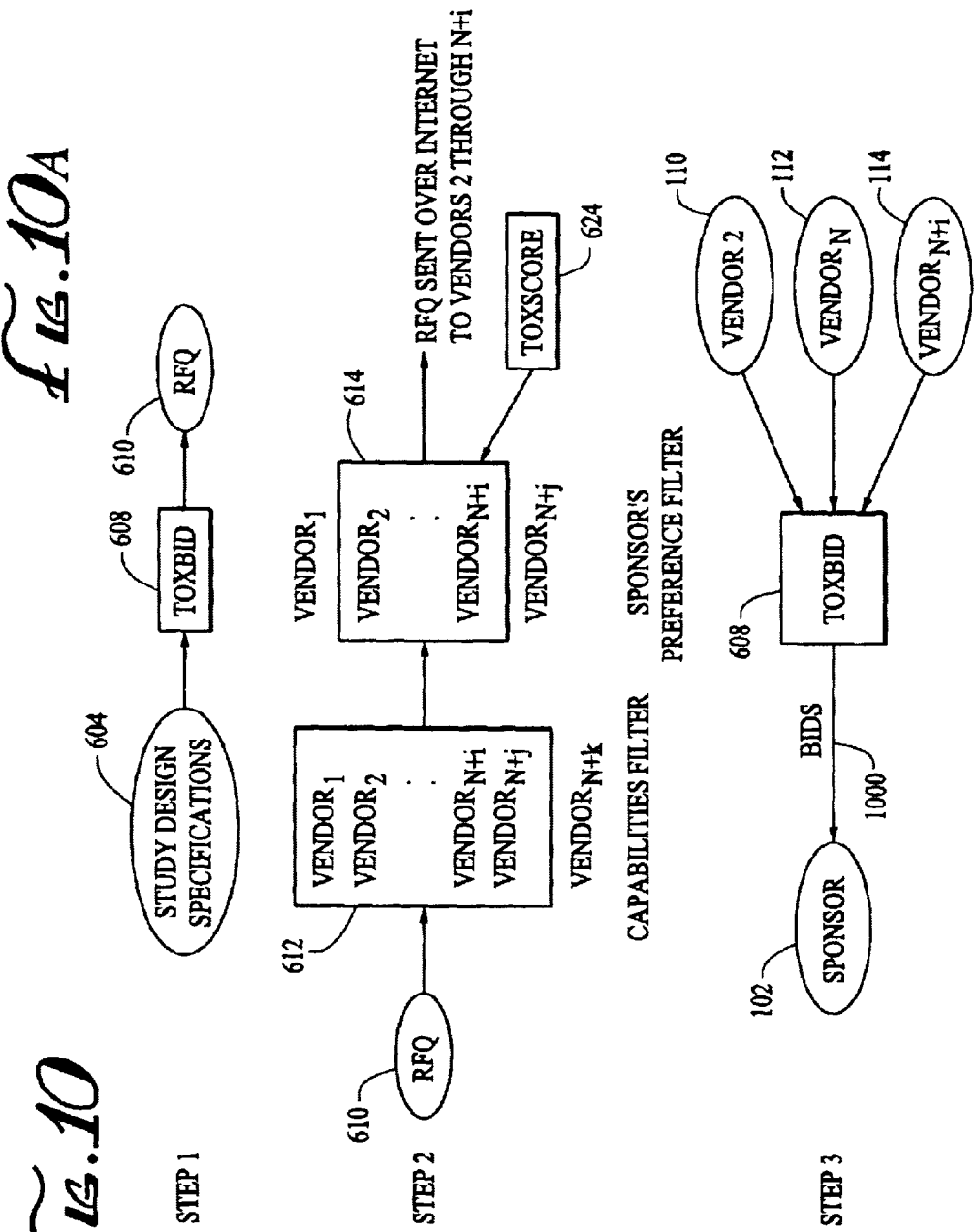

TOX | WE

826013

→ COMPLETE BIDDING PROCESS  ⟵ 1112

VENDOR LISTING   ⟵ 1116

| | NAME | DELETE |
|---|---|---|
| 1. | CHRYSALIS | ☐ |
| 2. | COVANCE, VIRGINIA | ☐ |
| 3. | COVANCE, WISCONSIN | ☐ |
| 4. | CTBR | ☐ |
| 5. | PRIMEDICA-MASON | ☐ |
| 6. | SIERRA BIOMEDICAL | ☐ |

[IMPORT]  [SAVE]
  1118    1120           ⟵ 1106 fig. 11B

Fig. 13A

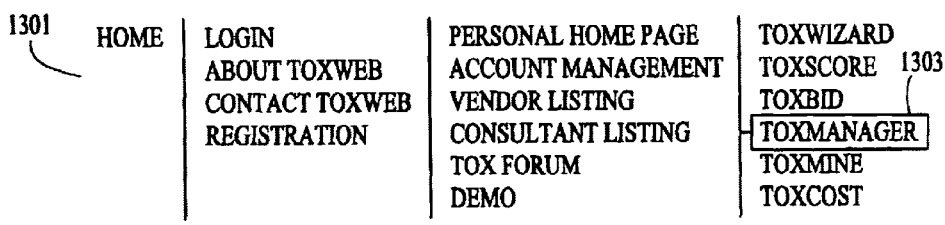

| 1301 HOME | LOGIN<br>ABOUT TOXWEB<br>CONTACT TOXWEB<br>REGISTRATION | PERSONAL HOME PAGE<br>ACCOUNT MANAGEMENT<br>VENDOR LISTING<br>CONSULTANT LISTING<br>TOX FORUM<br>DEMO | TOXWIZARD<br>TOXSCORE 1303<br>TOXBID<br>TOXMANAGER<br>TOXMINE<br>TOXCOST |

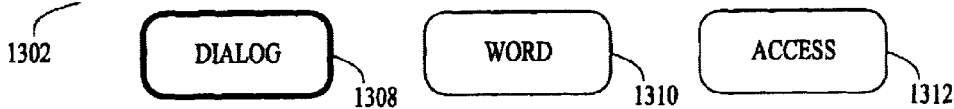

TOX | MANAGER    BDNF 3-MONTH ORAL DOG 1302  (DIALOG) 1308    (WORD) 1310    (ACCESS) 1312

1320 — DISCUSSION ITEM

| ▫ LIVER ENZYMES |
| PAST OBSERVATIONS DOSE RELATED? |
| TIMING OF OBSERVATIONS |
| DEPENDS ON DOSE |
| DOGS MAY BE DIFFERENT |
| ▫ ANY NEED FOR BEHAVIORAL TESTING? |
| ▫ WHY NOT USE MONGRELS |
| DISAGREE ABOUT BEAGLES |
| MY EXPERIENCE ALSO |
| BEAGLES IT IS |
| ▫ MONITOR SGOT MORE FREQUENTLY |

1304

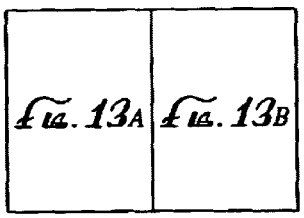

| 1401 HOME | LOGIN | PERSONAL HOME PAGE | TOXWIZARD |
| | ABOUT TOXWEB | ACCOUNT MANAGEMENT | TOXSCORE — 1403 |
| | CONTACT TOXWEB | VENDOR LISTING | TOXBID |
| | REGISTRATION | CONSULTANT LISTING | TOXMANAGER |
| | | TOX FORUM | TOXMINE |
| | | DEMO | TOXCOST |

TOX | SCORE     VENDOR RATING SYSTEM 1402   ( VIEW SCORES ) —1408    ( VIEW SURVEYS ) 1410

VENDOR LISTING: —1414

CLINTRIAL BIORESEARCH
COVANCE LABORATORIES, VIRGINIA
COVANCE LABORATORIES, WISCONSIN
HUNTINGDON LABORATORIES
PHOENIX, INC
1404
SIERRA BIOMEDICAL
ETC...

1416
COVANCE LABORATORIES, VIRGINIA

SURVEY RESULTS:
OVERALL SCORE: ★★★★ 1/2
BUSINESS ASPECTS: ★★★
STUDY EXECUTION: ★★★★
STUDY DIRECTORS: ★★★★
TIMELINESS: ★★★ 1/2
RESPONSE RATE ON SURVEY: 78%

1420

1406

| FIG. 14A | FIG. 14B |

TOX | WE ( SUBMIT SURVEY )  —1412

REGULATORY INFORMATION:

RECENT GLP AUDITS BY FDA:
    AUGUST 1996: NO CITATIONS
    JUNE 1999: 464, RECORD KEEPING
    JUNE 2000: 464, INSTRUMENT CALIBRATION

GLP AUDIT BY OTHER AGENCIES:
    JULY 2000 BY EMEA: NO CITATIONS

ALAC ACCREDITED: SINCE 1986

USDA CERTIFIED: SINCE 1998

1422—

STAFF:

37 P.H.D. SCIENTISTS
CVS OF KEYPERSONNEL
3 DVM
2 DVM, P.H.D.
28 STAFF ARE DABT

1424—

( VIEW VENDOR PAGE )
—1418

FIG. 15A

| | | | |
|---|---|---|---|
| HOME | LOGIN<br>ABOUT TOXWEB<br>CONTACT TOXWEB<br>REGISTRATION | PERSONAL HOME PAGE<br>ACCOUNT MANAGEMENT<br>VENDOR LISTING<br>CONSULTANT LISTING<br>TOX FORUM<br>DEMO | TOXWIZARD<br>TOXSCORE<br>TOXBID<br>TOXMANAGER<br>TOXMINE — 1503<br>TOXCOST |

TOX | MINE   DATABASE ANALYSIS

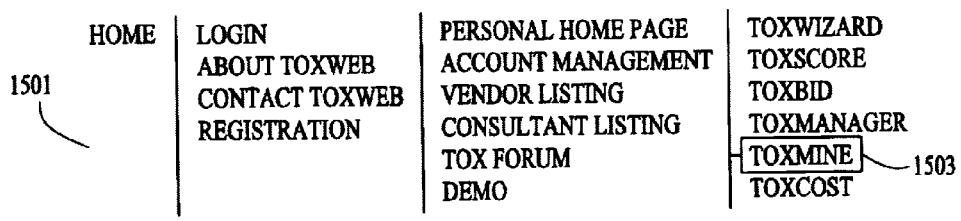

SELECT CHART TYPE:
- o PIE CHART
- o QUARTERLY
- o SPREADSHEET

SELECT OUTPUT UNITS:
- o DOLLAR VALUES
- o NUMBER OF:
- o PERCENT TOTALS OF:
- o OVERALL VENDOR RATING BY:

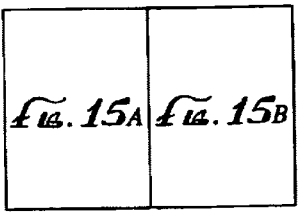

TOX | WE

SECOND SELECTION PARAMETER ▶ TIMING SELECTION ▶ PLO 1512, 1514, 1516

IMPORT  SAVE  RESET 1522, 1524, 1526

1506

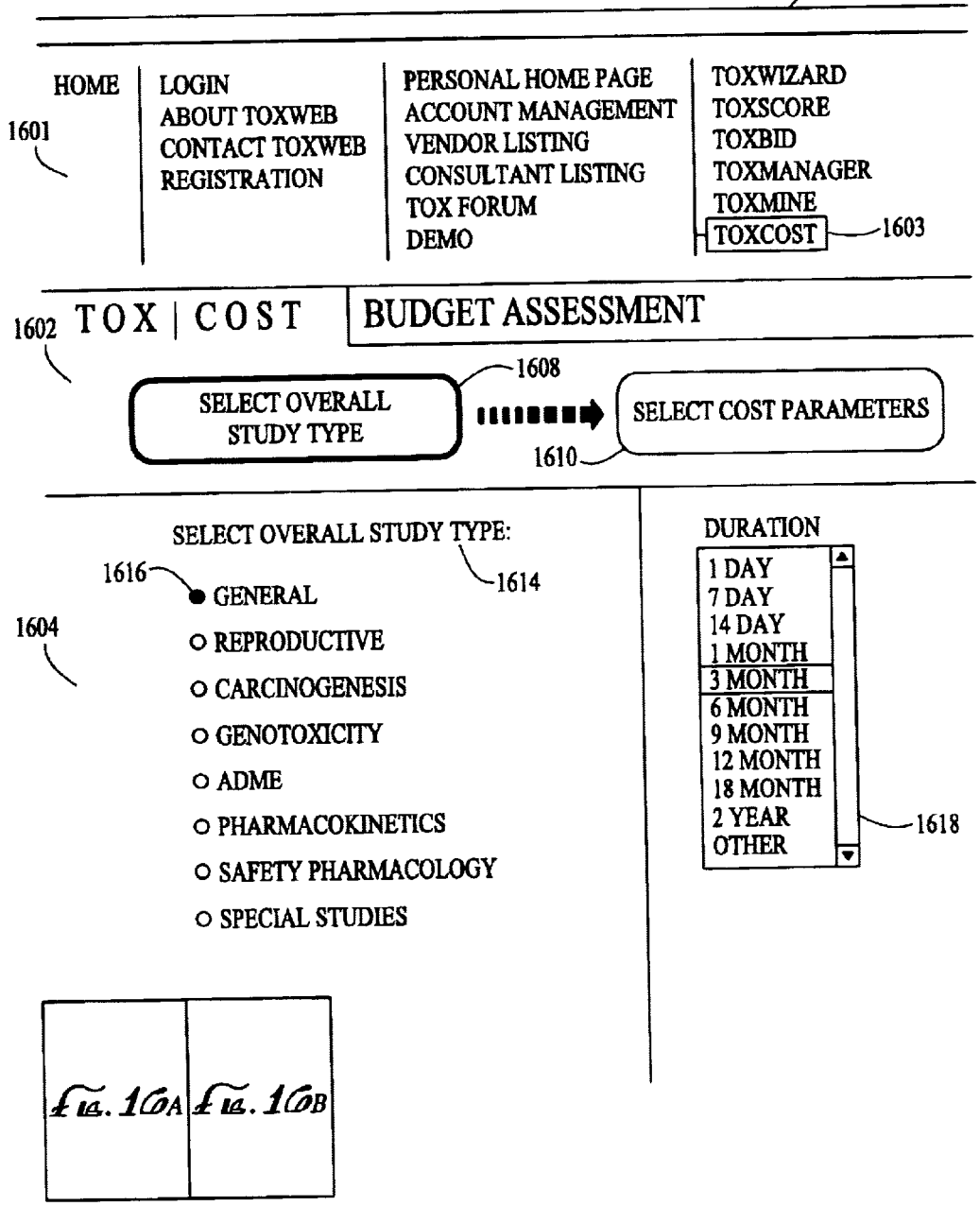

FIG. 16B

TOX | WE

→ SELECT OUTPUT TYPE — 1612

ROUTE — 1620
- ORAL
- PARENTERAL
- TOPICAL
- OPTIC
- CNS
- INHALATION
- OTHER

SPECIES — 1622
- MOUSE
- RAT
- HAMSTER
- GUINEA PIG
- RABBIT
- DOG
- PIG
- NON-HUMAN PRIMATE
- OTHER

1624 — IMPORT    1626 — SAVE    1628 — RESET

1606

TECHNIQUE FOR SPECIFYING THE PARAMETERS OF COMPLEX TECHNICAL STUDIES BY USING A DECISION TREE

BACKGROUND OF THE INVENTION

1. Field of the Invention.

The present invention generally relates to the technical study contracting process (TSCP) and in particular to a technique for specifying the parameters of a complex technical study by creating and using a decision tree.

2. Description of Related Art.

Traditional techniques for establishing the design of a technical study and the business and scientific terms and conditions under which a provider of technical services will offer to provide such services to a person or entity in need of such services involves the exchange of study design specifications between a sponsor and a limited number of vendors.

The technical study contracting process (TSCP) involves both a sponsor and a vendor. As used herein, a sponsor is a buyer of services who submits a request for quote (RFQ) to a vendor who is a seller of services, and a vendor offers its services to a sponsor by responding to the RFQ.

The number of vendors solicited for RFQ's is frequently limited because sponsors tend to request estimates for study costs by approaching one vendor at a time and have no system to facilitate solicitation. Approaching vendors in this manner often leads to inconsistent study descriptions and wide variations in pricing responses to the RFQ from the vendors. To avoid this problem, some sponsors hire consultants to obtain cost estimates from vendors. Consultants may also be hired to provide cost estimates based upon the consultant's opinion and experience. Many consultants, however, obtain information from a small number of vendors - vendors whom the consultants have worked with in the past. This limited number of vendors hinders the competitive bidding process, and sometimes leads to a sponsor's dissatisfaction with the technical study results.

Obtaining pricing is only one of the activities involved in the technical study contracting process (TSCP). Other activities include specifying the parameters of the study, evaluating potential vendors after bids are received, and communication between the sponsor and the vendor after the vendor is selected. Specifying the parameters of a study, involves providing sufficient detail to allow a vendor to accurately estimate cost. In particular, a sponsor must identify each study parameter that affects the cost of the study. This step is difficult because a sponsor may lack information about the identity of cost drivers, hence, the sponsor may inaccurately specify the parameters. An inaccurate specification will most likely result in an inaccurate cost estimate.

Further, the current system of specifying parameters is not standardized. Each sponsor has their own system for specifying parameters. Some of the systems are less complete than others. As a result, vendors must learn to cope with variations in the specification completeness, as well as, variations in the specification layout and specification description. To clarify any ambiguities, the sponsors and vendors tend to exchange telephone calls and facsimiles. This lack of standardization is both cumbersome and time consuming.

Another activity involved in the technical study contracting process (TSCP) involves evaluating the performance capability and quality of the vendor. Many sponsors experience difficulty when attempting to evaluate a potential vendor's past performance because many key aspects of the vendors performance are not rated by an authoritative body. Sometimes sponsors obtain information about a vendor's performance from consultants. Most consultants, however, may only have limited vendor information on a limited number of vendors.

With respect to communication during the execution of the study, both sponsors and vendors tend to experience significant difficulty. Frequently, sponsors and vendors communicate with each other via telephone, facsimile, and e-mail. Missed telephone calls, unopened e-mails, and delayed facsimiles result in technical study delays. For example, a study may be delayed when a vendor misses a telephone call concerning the administration of the study. Similarly, studies are often delayed when a sponsor misses a call concerning a response to an unexpected event or observations.

Some conventional services have attempted to provide assistance to sponsors and vendors. For example, ToxPrices.com (at http://www.toxprices.com) assists sponsors in preparing a budget for a toxicology technical study. Another service, inceutica.com (at http://www.inceutica.com) assists market participants with the bidding process.

Regarding ToxPrices.com, this service allows a sponsor to estimate service price comparison with the prices of past toxicology studies at a single vendor. These prices are stored in the ToxPrices.com database. ToxPrices.com, however, disadvantageously lacks significant capabilities regarding other complex technical study activities, such as the complete specification of parameters, negotiating the bid or managing the study. Further, ToxPrices.com is only useful for toxicology studies, and not for other specialized studies. With respect to the prices of past toxicology studies, ToxPrices.com only uses data from one vendor, instead of using data from a multiple and diverse pool of vendors.

Concerning inceutica.com, this service allows pharmaceutical firms to place request for quotes (RFQs) on the site, and allows clinical research organizations (CRO) to place bids for that work. Inceutica.com, however, disadvantageously lacks any means to develop or specify study parameters, selective filtering methodologies to direct RFQs to appropriate vendors, methods and systems to manage studies or methods and practices for evaluating the performance capability and quality of the vendor.

Therefore, there is a need in the art for an improved technique for conducting the technical study contracting process (TSCP).

SUMMARY OF THE INVENTION

To overcome the limitations in the prior art described above, and to overcome other limitations that will become apparent upon reading and understanding the present specification, discloses a method, apparatus, and article of manufacture for specifying the design and execution related parameters of a technical study by creating and using a decision tree.

In accordance with an embodiment of the present invention, a decision tree is created that has interdependent decision nodes. One or more decision choices is associated with each interdependent decision nodes. The interdependent decision nodes are ordered in a hierarchical manner such that a selection of one of the decision choices dynamically and functionally determines the manner in which a subsequent decision choice is affected. This embodiment of the present invention has utility for objectively defining study parameters and thereby substantially stream lining the design specification process for complex technical studies.

BRIEF DESCRIPTION OF THE DRAWINGS

Referring now to the drawings in which like reference numbers represent corresponding parts throughout:

FIGS. 4A and 4B are a block diagram that represents a portion of a decision tree that could be used in accordance with an embodiment of the present invention;

FIG. 7 is a flowchart that illustrates the steps performed when specifying, negotiating, managing, and evaluating a contract in accordance with an embodiment of the present invention;

FIGS. 8A and 8B are a screenshot that illustrates the ToxWizard™ graphical user interface (GUI) in accordance with an embodiment of the present invention;

FIG. 9 is a flowchart that represents the steps performed when specifying a study design specification in accordance with an embodiment of the present invention;

FIGS. 10A and 10B are a block diagram that graphically illustrates the steps performed by ToxBid™ in accordance with an embodiment of the present invention;

FIGS. 11A and 11B are a screenshot that shows the ToxBid™ GUI in accordance with an embodiment of the present invention;

FIGS. 13A and 13B are a screenshot that shows the ToxManager™ GUI in accordance with an embodiment of the present invention;

FIGS. 14A and 14B are a screenshot that shows the ToxScore™ GUI in accordance with an embodiment of the present invention;

FIGS. 15A and 15B are a screen shot that shows the ToxMine™ GUI in accordance with an embodiment of the present invention; and FIGS. 16A and 16B are a screen shot that shows the ToxCost™ GUI in accordance with an embodiment of the present invention.

DETAILED DESCRIPTION OF THE PREFERRED EMBODIMENTS

Glossary

Figure 1:
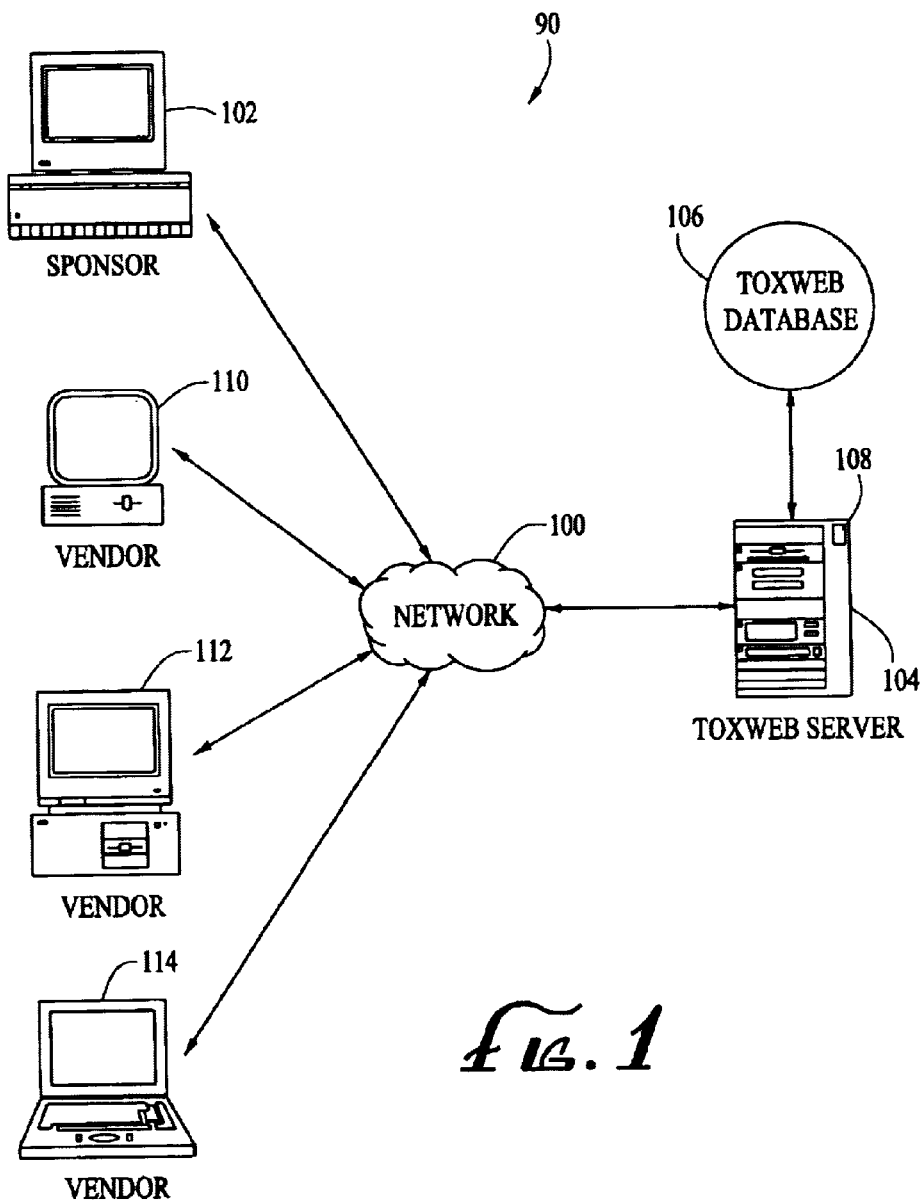
FIG. 1 represents a hardware environment that could be used in accordance with an embodiment of the present invention.

A glossary is included that provides definitions and further information concerning the terminology used in describing embodiments of the present invention. It should be understood that these definitions apply to exemplary embodiments, and do not limit the invention to the scope of the defined terminology. This glossary is only provided to facilitate the description of embodiments of the invention, including its components and features. The glossary does not preclude the claims from encompassing embodiments that may be described by using different terminology.

Complex technical study:

Complex technical study refers to, but is not limited to, scientific or laboratory studies in the following areas: general toxicology, including environmental and safety, industrial hygiene and safety, and pharmaceutical drug development. Pharmaceutical drug development and commercialization activities include analytical chemistry services; process development and bench scale product manufacturing services; clinical manufacturing and non-commercial scale production services,; pharmaceutical contract product manufacturing services; small molecule chemistry development services including synthesis and analysis; genetic, genomic or proteomic analysis, testing, laboratory and/or data services; human or veterinary clinical trial drug development services; and ADME and pharmacokinetics.

Toxicology activity:

Toxicology activity refers to, but is not limited to, activities pertaining to the in vivo or in vitro testing and analysis of chemical or biochemical moeties, such as environmental testing and analysis, industrial hygiene and safety testing and analysis, pharmaceutical drug development analysis and testing.

Pharmaceutical drug research, development and commercialization activities:

Pharmaceutical drug development and commercialization activities refers to, but is not limited to, activities pertaining to, discovery, animal testing, lead optimization, small molecule chemistry and synthesis, process development, manufacturing, chemical analysis, and human testing.

Market data:

Market data refers to any and all data concerning services and service participants, including, but not limited to, the following: geographic distribution of study participants; types of studies performed; cost or size of studies; participant(s) market share; trends and/or data relationships; participant service utilization data; cost drivers; participant performance data; participant characterization data.

TSCP:

The technical study contracting process (TSCP) includes, but is not limited to, the specification of the execution requirements, budgeting, RFQ development, bidding and awarding, management, vendor performance evaluation, as well as, the storage, retrieval and analysis of all pertinent and related market and other data.

Study Design Specifications:

A set of definitional or objective characterization parameters which accurately describe the objectives, execution and operational/instructional requirements for a complex technical study.

Overview

The present invention facilitates the TSCP of Complex Technical Studies. Moreover, the invention can be applied to any study or activity that involves, among other things, a sequence of objectively definable procedures, conditions, scientific or technical causal relationships, data and/or information relationships. By example, such activities would include drug preparation techniques; routine clinical examination techniques; drug administration techniques; animal experiments, chemical, tissue or other scientific analysis; or chemical or bio-chemical purification techniques.

The present invention further objectively specifies the parameters and requirements for complex technical studies and/or activities by applying expert knowledge based systems that are embodied in a decision tree. As used herein, expert knowledge based systems are systems in which experience, knowledge, judgement, training and the technical and/or scientific insight of experts in the field has been captured by rule sets that define the content and operation of a decision tree.

As used herein, a decision tree is set of hierarchically arranged causal relationships that partition a complex technical study design specification into a set of well-defined nodes. Specifically, each aspect of the design specification is associated with a different node. The top of the decision tree (or the first node) corresponds to the start of the decision process. At each node, a sequence of decisions is made based on user input, before going on to the remaining nodes.

Other advantageous features of the present invention regarding the TSCP include techniques for: creating and using the decision tree, negotiating a bid, facilitating the communication between a sponsor and a vendor after bid selection, collecting and communicating data and information regarding the execution of the study, developing and accessing information about the performance capability and quality of the vendor, collecting and mining data on study costs, and collecting and mining market data.

Before providing a detailed description of each of the above-identified features, the hardware associated with the present invention will be discussed.

Hardware

FIG. 1 Schematically illustrates the hardware environment of a preferred embodiment of the present invention, and more particularly, illustrates a computer system 90 using a network 100 to connect three types of computer system entities: a sponsor 102, vendors 110, 112, and 114, a server 104. The sponsor 102, the vendors 110, 112, and 114, and the server 104 are bi-directionally coupled over a line or via a wireless system. In an embodiment of the present invention, the network 100 is the Internet. Of course, other networks could be used without exceeding the scope of the present invention.

The present invention is preferably implemented in one or more computer programs or applications (hereinafter referred to as ToxWeb™) that are depicted in FIG. 1 by reference numeral 108. ToxWeb™ 108 expedites the placement of contracts for complex technical studies by using a decision tree. In response to a message sent either from a sponsor 102 or a vendor 110, 112, or 114, ToxWeb™ 108 operates under the control of the server operating system (not shown). ToxWeb™ 108 receives information from both the sponsor 104 and the vendors 110, 112, and 114, and stores the received information in the ToxWeb™ database 106, which is connected to the server 104.

Those skilled in the art will recognize that the exemplary hardware environment illustrated in FIG. 1 is not intended to limit the present invention. Indeed, those skilled in the art will recognize that other alternative hardware environments may be used without departing from the scope of the present invention.

Creating a Decision Tree

A decision tree is set of decisions that partitions a study or activity specification into a set of nodes. Specifically, each parameter of the study or activity specification is associated with one or more different nodes. The top of the decision tree (or the first node) corresponds to the start of the decision process. At each node, a sequence of decision choices is made based on user input, before going on to the remaining nodes. The nodes are ordered in a hierarchical manner, such that a selection of one of the decision choices eliminates or selects a subsequent decision choice.

Figure 2:
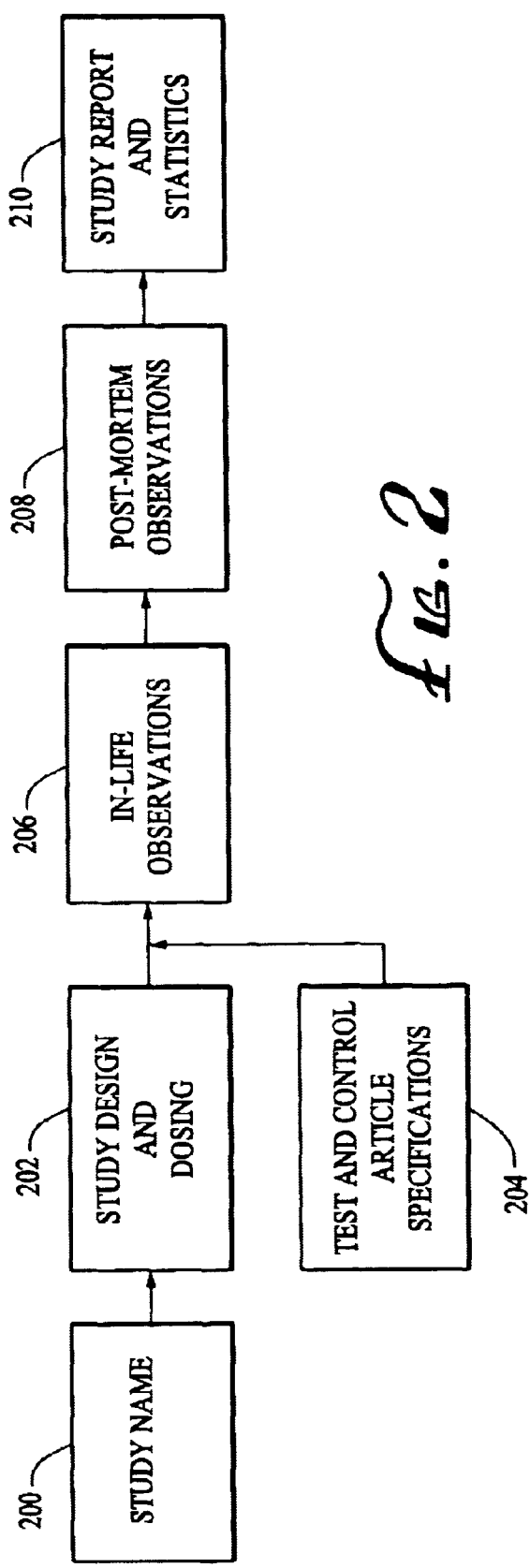
FIG. 2 is a block diagram that represents a hierarchical structure of nodes in a decision tree for a toxicology study that could be used in accordance with an embodiment of the present invention.

FIG. 2 is a block diagram that represents an exemplary hierarchical structure of nodes in a decision tree for a toxicology study. The Study Name node 200 is at the top of the decision tree, and it represents the start of the decision process. The Study Report and statistics node 210 is at the bottom of the decision tree, and it represents the end of the decision process. The interior nodes include the Study design and dosing node 202, the Test and Control Article specifications node 204, the In-Life observations node 206, and the Post-Mortem Observation node 208.

Of course, other nodes could be defined for a toxicology technical study without exceeding the scope of the present invention. Moreover, depending on the particular complex technical study, different nodes could be defined without exceeding the scope of the present invention. In fact, appropriate nodes can be defined for any study that is composed of well-defined elements, which require the use of standardized techniques.

Some exemplary studies include studies of assays for purity, potency, drug levels, metabolite levels, and antibody response of the organism/patient. For the above-identified assay studies, an exemplary hierarchical structure of nodes may include a Select Study Type node, Select Assay Methods node, and a Select Matrix node.

Referring back to FIG. 2, in many cases, particular decision choices are associated with a node because the selection of the decision choice may cause the elimination or selection of subsequent decision choices. For example, the decision choices that are associated with both the Study Name node 200 and the Study design and dosing node 202 cause the elimination of decision choices at subsequent nodes.

Figure 3:
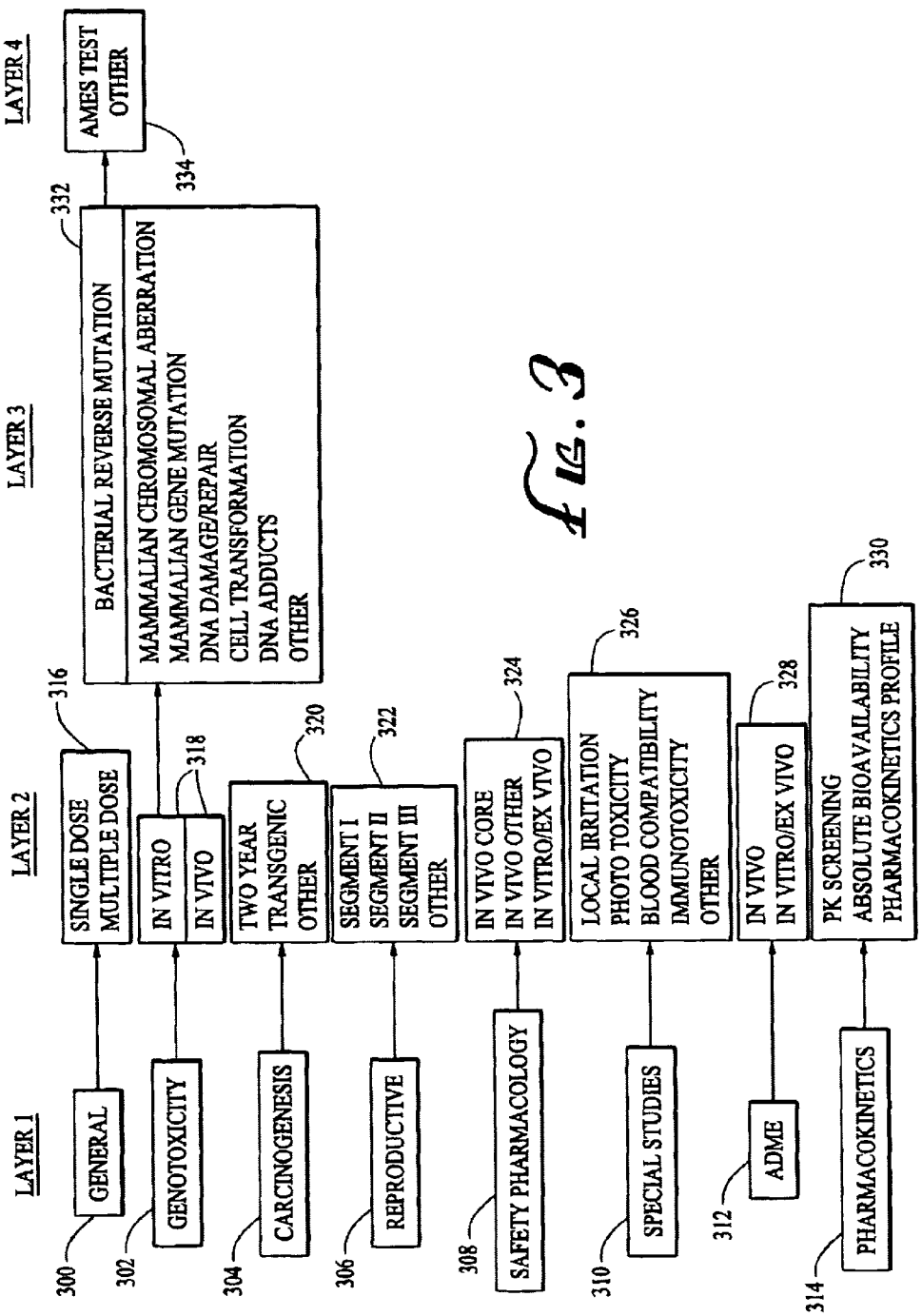
FIG. 3 is a block diagram that represents four layers of decision choices that could be used in accordance with an embodiment of the present invention.

FIG. 3 is a block diagram that represents four layers of decision choices for the Study Name node 200 that could be used in accordance with an embodiment of the present invention. Layer 1 300 contains eight decision choices for study type: General 300 Genotoxicity 302, Carcinogenesis 304, Reproductive 306, Safety Pharmacology 308, Special Studies 310, ADME 312, and Pharmocokinetics 314.

Choosing one of the eight study types shown in FIG. 3, eliminates seven sequences of decision. For example, choosing the study type Genotoxicity 302 eliminates decision choices 316, 320, 322, 324, 326, 328 and 330. It is noted that each of these decision choices 316, 318, 320, 322, 324, 326, 328 and 330 contain two or more parameters from which to choose. In the case of the study type Genotoxicty 302, a user only chooses between two parameters, "In Vitro" and "In Vivo," as shown in decision choice 318, rather than choosing between upwards of twenty-two parameters.

The choice of the study type Genotoxicity 302 also leads to decision choices 332 and 334. When a user chooses a study type other than Genotoxicity 302, the user avoids both decision choices 332 and 334. That is, choosing a study type other than Genotoxicity eliminates the decision choices 332 and 334. It is noted that after the Study Name node 200, the remaining nodes can be ordered arbitrarily.

In other cases, particular decision choices are associated with a node because the decision choices are related to each other. To illustrate, for the Test and Control Article specifications node 204, the decision choices include, among others: number of test control articles, specification of test articles and specification of control article. Each of these decision choices are related to specifying the test and control articles. Similarly, for the remaining nodes 206, 208, and 210, particular decision choices are associated with these nodes 206, 208, and 210 because the decision choices are related.

Figure 4B:
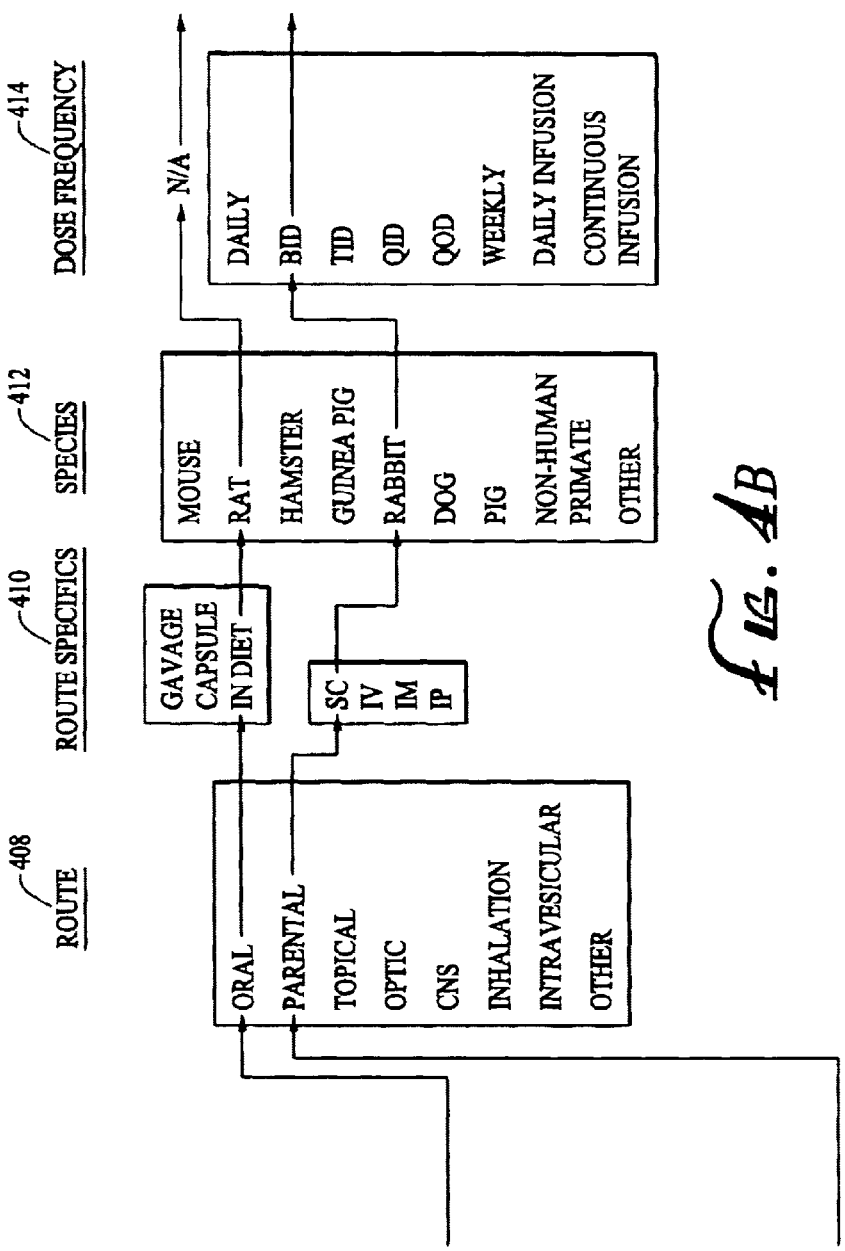

FIGS. 4A and 4B are a block diagram that represents a portion of a decision tree that could be used in accordance with an embodiment of the present invention. In particular FIGS. 4A and 4B represent, a sequence of decisions for the Study Name node 200. The sequence of decisions (or sub-nodes) include the following: Study Type 400, Sub-Type 402, Regulatory 404, Duration 406, Route 408, Route specifics 410, Species 412, and Dose Frequency 414. Each of the sub-nodes include decision choices that are related to each other. Namely, for Duration 406, each of the decision choices refer to a time duration (e.g., 1 day, 2 days, 3 days, etc.).

The process of creating a tree involves several steps. First, the tree creator must identify all of the parameters of a study or activity that influence the price of the study. This identification process is best accomplished with the assistance of experienced practitioners in the field.

Second, the tree creator groups the parameters into nodes (also referred to as modules) that contain related items. Experts in the field then evaluate and analyze the groupings by looking for relationships and dependencies between the nodes. These relationships and dependencies are then used to build logic into the decision tree. Such logic includes determining when to include or exclude subsequent decision tree nodes, 15 depending on the choices made at previous nodes. Grouping the parameters in this manner simplifies navigation of the decision tree by eliminating irrelevant or illogical choices, and builds in the knowledge of the experts by including their guidance for appropriate nodes.

Figure 5:
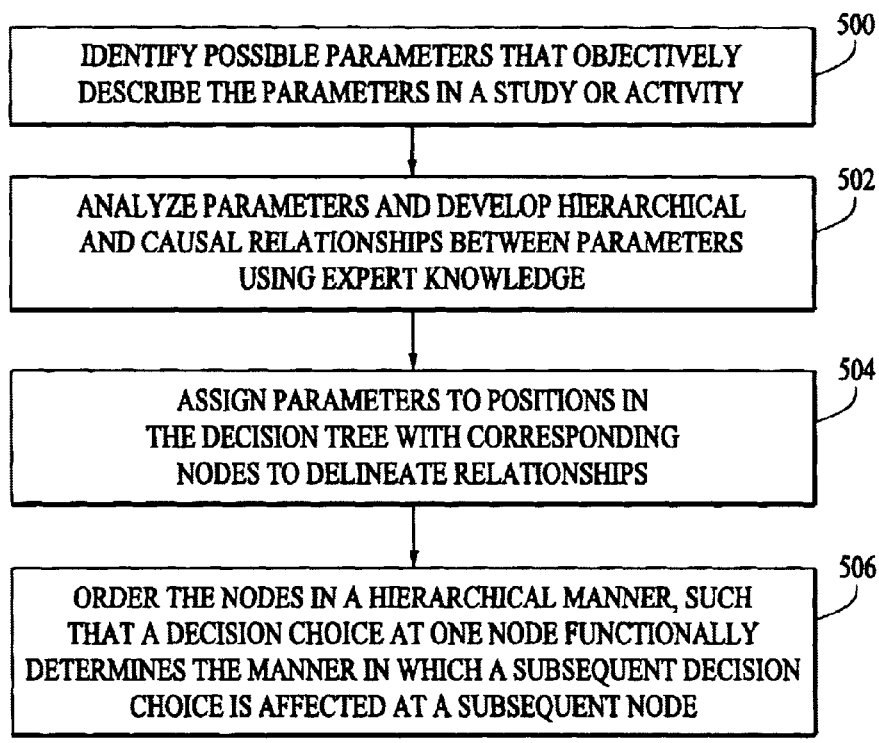
FIG. 5 is a flow chart that illustrates the steps performed when creating a decision tree in accordance with an embodiment of the present invention.

FIG. 5 is a flow chart that illustrates the steps performed when creating a decision tree in accordance with an embodiment of the present invention. Block 500 represents the present invention identifying possible parameters that objectively describe the parameters in a study or activity. The present invention then analyzes the parameters and develops a hierarchical and causal relationships between parameters by using expert knowledge, as represented by block 502. The parameters are then assigned parameter positions in the decision tree with corresponding nodes to delineate relationships, as represented by block 504. Block 506 represents the nodes being ordered in a hierarchical manner, such that a decision choice at one node functionally determines the manner in which a subsequent decision choice is affected at a subsequent node. It is noted that the identity of both the parameters and the nodes are based on the particular study or activity. Therefore, different studies or activities will have different parameters and different nodes.

Specifying, Negotiating, Managing, and Evaluating a Contract

Facilitating the TSCP of complex technical studies, toxicology activities, and pharmaceutical drug research, development and commercialization activities involves, among other things, specifying design parameters, negotiating the bid, managing the technical study, and evaluating study participants. The study participants include sponsors, vendors, and/or consultants.

Figure 6A:
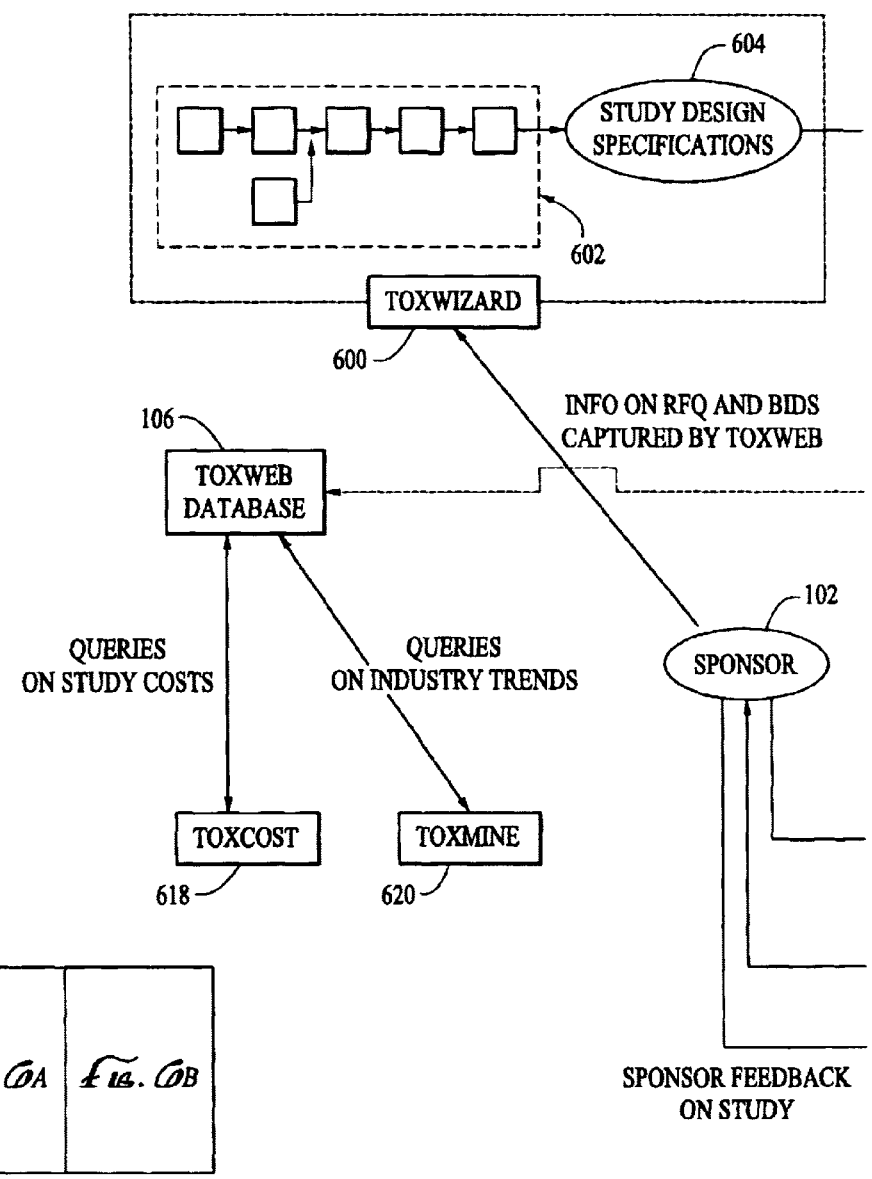
FIGS. 6A and 6B are a block diagram that graphically illustrates the steps performed by each functionality of ToxWeb™ in accordance with an embodiment of the present invention.
Figure 6:
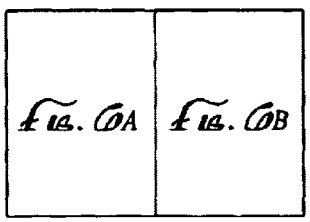
Figure 6B:
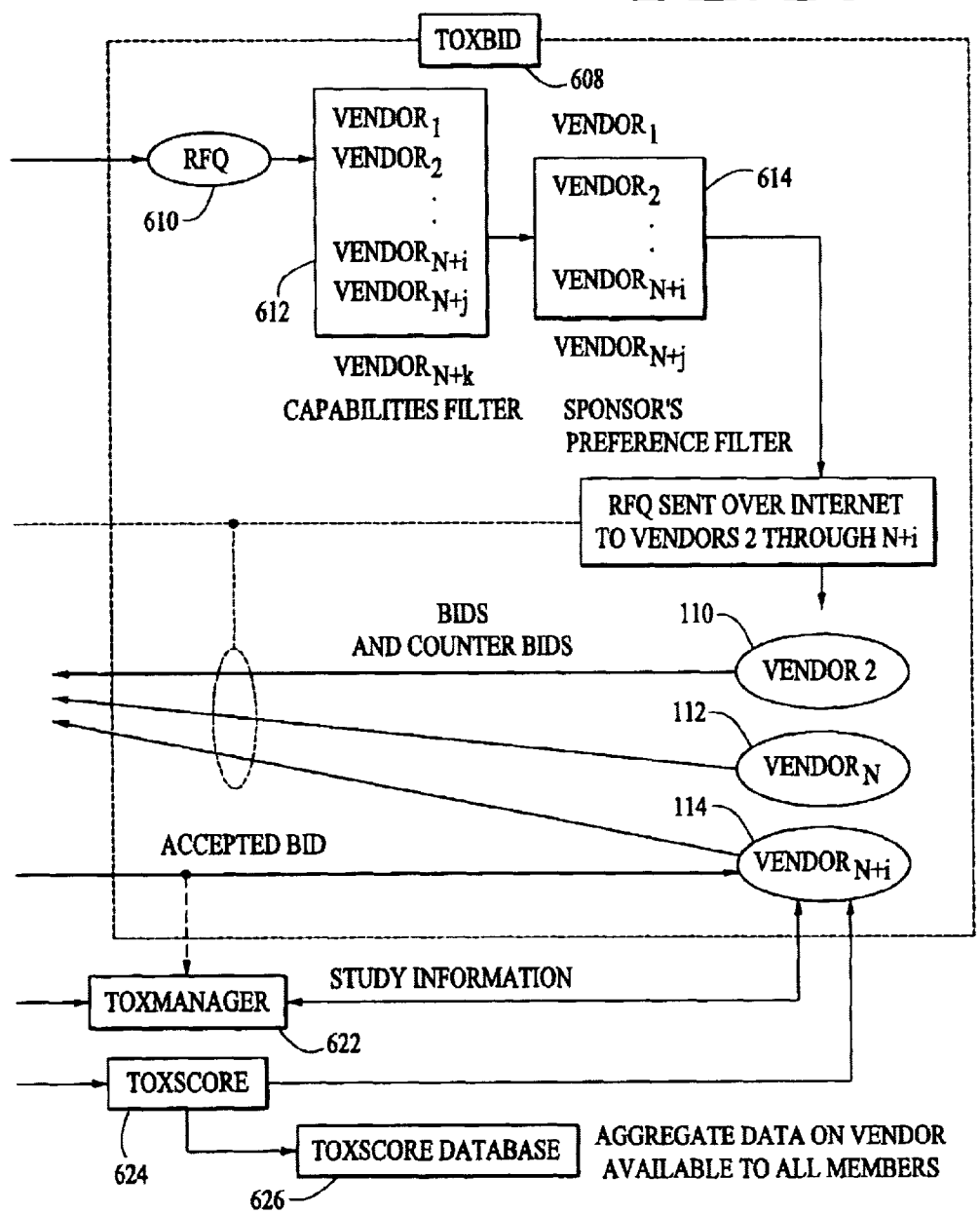

FIGS. 6A and 6B are a block diagram that graphically illustrates the steps performed by each functionality of ToxWeb™ 108 in accordance with an embodiment of the present invention. With respect to specifying, ToxWeb™ 108 accurately specifies the parameters of a complex technical study by using a technique that is referred to herein as ToxWizard™ 600. ToxWizard™ 600 uses a decision tree 602 to specify the parameters of a complex technical study. A user produces a study design specification 604 by making all of the decision choices at each node in the decision tree 602. As used herein, a user is a sponsor, consultant, or any other person or entity that seeks to place a complex technical study contract.

ToxWeb™ 108 negotiates a bid by using a technique that is referred to herein as ToxBid™ 608. ToxBid™ 608 converts the specifications produced by ToxWizard™ 600 into requests for quotes (RFQ's) 610. A RFQ 610 includes all of the specifications, as well as, milestone and dates. ToxBid™ 608 uses a technique of routing RFQs 610 to vendors 110, 112, and 114, based on both a vendor's capabilities and a sponsor's desires. After delivering the RFQs 610, ToxBid™ 608 negotiates the competitive bidding process for a complex technical study contract. Specifically, ToxBid™ 608 routes bids and communications between the sponsor 102 and the vendor 110, 112, and 114, using technical capability filters (i.e., a vendor capability filter 612 and a sponsor preference filter 614). With respect to the filters, other filters could be used, such as, vendor preference filters, without exceeding the scope of the present invention.

Each vendor 110, 112, and 114 may bid for the study. Before accepting a bid from a vendor 110, 112, or 114, the sponsor 102 may obtain information about each capable vendor 110, 112 and/or 114 from ToxScore™ 624. In response to a sponsor 102's request, ToxScore™ 624 solicits and receives information about capable vendors 110, 112, and 114 from the ToxScore™ database 626. Once a bid is accepted, the sponsor 102 and the selected vendor 110, 112, or 114 can communicate via ToxManager™ 622.

With respect to the ToxWeb™ database 106, ToxBid™ sends the information contained in the RFQ 610 to the ToxWeb™ database 106. The ToxWeb™ database 106 has three functional partitions. The first partition is the ToxScore™ database 626, which contains information concerning a vendor's past performance. The second partition is the ToxCost™ database 618, which contains information concerning the cost of a study. The third partition is the ToxMine™ database 620, which contains information concerning the market data. Of course, a different database design with different partitions could be used without exceeding the scope of this invention.

Once a sponsor 102 selects a vendor 110, 112, or 114, ToxManager™ 622 provides the sponsor and vendor with a set of functionalities that are designed to allow near real time communication via a computer network 100 (shown in FIG. 1). ToxManager™ 622 contains tools to allow threaded discussions about study observations or administrative matters. In addition, ToxManager™ 622 has spreadsheet functions and word processing functions for posting data tables, text, and other documents. ToxManager™ 622 also has program management functions and other functions for enabling the communication of project timelines.

Additional functionalities of ToxWeb™ 108 include the following: ToxCost™ for providing an estimate of the costs associated with a complex technical study and ToxMine™ for providing information concerning market data.

FIG. 7 is a flowchart that illustrates the steps performed when negotiating a complex technical study in accordance with the present invention. Block 700 represents ToxWizard™ 600 generating the study design specifications 604 by using input from the sponsor 102. ToxBid™ 608 then converts the study design specification 604 into an RFQ 610 by adding milestones and dates, as represented by block 702. ToxBid™ 608 then sends the RFQ 610 to appropriate vendors 110, 112, and 114 and to the ToxWeb™ database 106, as represented by block 704.

Block 706 represents ToxBid™ 608 receiving bidding data and bidding information from vendors 110, 112, and 114, and forwarding this bidding data and information to the sponsor 102. ToxBid™ 608 then receives a vendor selection from the sponsor 102 as represented by block 708. It is noted that before selecting a vendor 110, 112 or 114, the sponsor 102 can obtain information about the vendors from ToxScore™ 624 (shown in FIGS. 6A and 6B).

Once the sponsor 102 has selected a vendor 110, 112, or 114, ToxManager™ 622 processes the communication of documents and information between the sponsor 102 and the selected vendor 110, 112 or 114, and stores the information in the 10 ToxWeb™ database 106, as represented by block 710. After the completion of the contract, ToxScore™ 624 solicits and receives vendor performance data from the sponsor 102. ToxScore™ 624 stores the vendor performance data in the ToxScore™ database 626, as represented by block 714.

Specifying Study Design Specifications

One of the advantageous features of the present invention is a technique (referred to herein as ToxWizard™ 600, shown in FIGS. 6A and 6B) for accurately defining the Study Design Specifications of a complex technical study. ToxWizard™ 600 is an orderly process for specifying the information required by the vendor to place a bid on a study without ambiguity. Unlike conventional services, the specification format is consistent. The present invention guards against inadvertent omissions or logical inconsistencies by offering the computer user required design choices in a well-ordered and logical manner. Hence, ToxWizard™ 600 can be described as codifying a technique of specifying parameters for bidding purposes.

Referring back to FIG. 2, at each node 200, 202, 204, 206, 208, and 210, a sponsor 102 (shown in FIGS. 6A and 6B) makes a sequence of decisions. For the Study Name node 200, a sponsor's decisions identify the study type. Based on these decisions, ToxWizard™ 600 (shown in FIGS. 6A and 6B) eliminates all of the irrelevant decision choices. from subsequent nodes. In particular, a sponsor 102 may choose one of eight major study types from an initial menu, such as Carcinogenesis. Based on this choice, the ToxWizard™ 600 eliminates irrelevant choices, such as choices related to reproductive toxicology or choices related to safety pharmacology.

For the Study Design and Dosing node 202, a sponsor's decisions determine the dose schedule, disposition of control, and satellite groups (including the construction of a study table). The Test and Control Article specifications node 204 includes decision choices for handling, dilution, and storage conditions for the compounds delivered to the animals in the study. The In-Life Observation node 206 includes decision choices related to the animal observation, such as general health, behavior, blood chemistries, and other test performed on the living animals. The Post-Mortem Observations node 208 include decision choices related to an animal sacrifice, including tissue fixation, necropsy conditions, and subsequent histopathology. The Study Report and Statistics node 210 includes decision choices that define the statistical analysis of the data, as well as, the content and timing of the study report.

ToxWizard™ 600 displays a modularized representation (also referred to as a functional representation) of a decision to the user by utilizing a menu-driven system. The menu-driven system allows a user to select decision choices from a menu. The menu can be any type of menu including, but not limited to, a bar menu, a pop-up menu, a cascading menu, a pull-down menu, a moving bar menu, a tear-off menu or any combination of the above-identified menus.

Figure 8B:
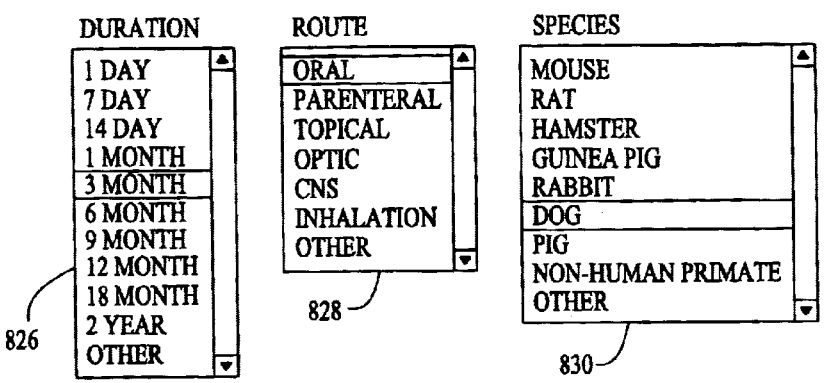

FIGS. 8A and 8B are a screenshot that illustrates the ToxWizard™ graphical user interface (GUI) 800 in accordance with an embodiment of the present invention. The ToxWizard™ GUI 800 has four frames: a table of contents (TOC) frame 801, a top frame 802, a left frame 804, and a right frame 806. The TOC frame 801 lists the title of each page contained within the ToxWeb™ 108 site. In particular, the TOC frame 801 lists each ToxWeb™ 108 functionality. When a user chooses a particular functionality, ToxWeb™ 108 displays the corresponding page to the user. For example, when a user chooses the ToxWizard™ selection 803, ToxWeb™ 108 displays the ToxWizard™ GUI 800. It is noted that the ToxWeb™ 108 site could be located on any system of internet servers, including, but not limited to, the World Wide Web (commonly referred to as WWW).

The top frame 802 contains a menu of command buttons 808, 810, 812, 814, 816, and 818. The command buttons represent each of the nodes 200, 202, 204, 206, 208, and 210 (shown in FIG. 2). Selecting a command button in the top frame 802, affects the content of the left frame 804. Likewise, selecting a decision choice in the left frame 804, affects the content of the right frame 806. It is noted that each GUI discussed herein uses the above-described three-frame format.

Selecting the name study command button 808 causes the ToxWizard™ GUI 800 to display choices related to the overall study type in the left frame 804. Selecting General 822 causes the ToxWizard™ GUI 800 to display the following choices: user study name 824, duration 826, route 828 and species 830. It is noted that the ToxWizard™ GUI 800 displays the user study name choice 824 by using a command-driven, rather than a menu-driven system. The command-driven system allows the user to enter the information, instead of selecting information from a menu.

The right frame 806 also includes an import command button 823, a save command button 834, and a reset command button 836. The import command button 832 allows a users to import the decision choices to the sponsor 102 (shown in FIG. 1). The save command button 834 allows a user to transmit the decision choices to the ToxWeb™ 108 server 104 (shown in FIG. 1). The reset command button 836 allows a user to reset the ToxWizard™ GUI 800 by removing the highlights from each frame 802, 804, and 806.

FIG. 9 is a flowchart that represents the steps performed by ToxWizard™ 600 (shown in FIGS. 6A and 6B) in accordance with the present invention. Block 900 represents ToxWeb™ 108 executing ToxWizard™ 600 in response to a user's request. ToxWizard™ 600 then displays a modularized representation of the decision tree to a user, as represented by block 902.

Block 904 represents ToxWizard™ 600 receiving a sequence of decision choices from the user. Based on the decision choices, ToxWizard™ 600 eliminates or selects one or more of the decision choices in subsequent nodes by applying rule sets and expertise, as represented by block 906.

Block 908 represents ToxWizard™ 600 displaying the result of the user's decision choices when a user request such a display. Block 910 represents ToxWizard™ 600 storing the user's decision choices when a user request such a storage.

Block 912 is a decision block that represents ToxWizard™ 600 determining whether there are more nodes. When there are more nodes, ToxWizard™ 600 returns to block 904. Otherwise, ToxWizard™ proceeds to block 914.

Block 914 represents ToxWizard™ 600 generating a complete study design specification 604 (shown in FIGS. 6A and 6B). The dashed block 916 represents ToxWizard™ ending.

Negotiating the Bidding Process

A second advantageous feature of the present invention is a technique for negotiating the bidding process (referred to herein as ToxBid™ 608, shown in FIGS. 6A and 6B). The bidding process involves a vendor 110, 112, or 114 (shown in FIGS. 6A and 6B) receiving a RFQ 610 (shown in FIGS. 6A and 6B) from a sponsor 102 (shown in FIGS. 6A and 6B). Based on the technical requirements contained in the RFQ 210, the vendors 110, 112, and/or 114 offer a price for performing a complex technical study.

Figure 10B:
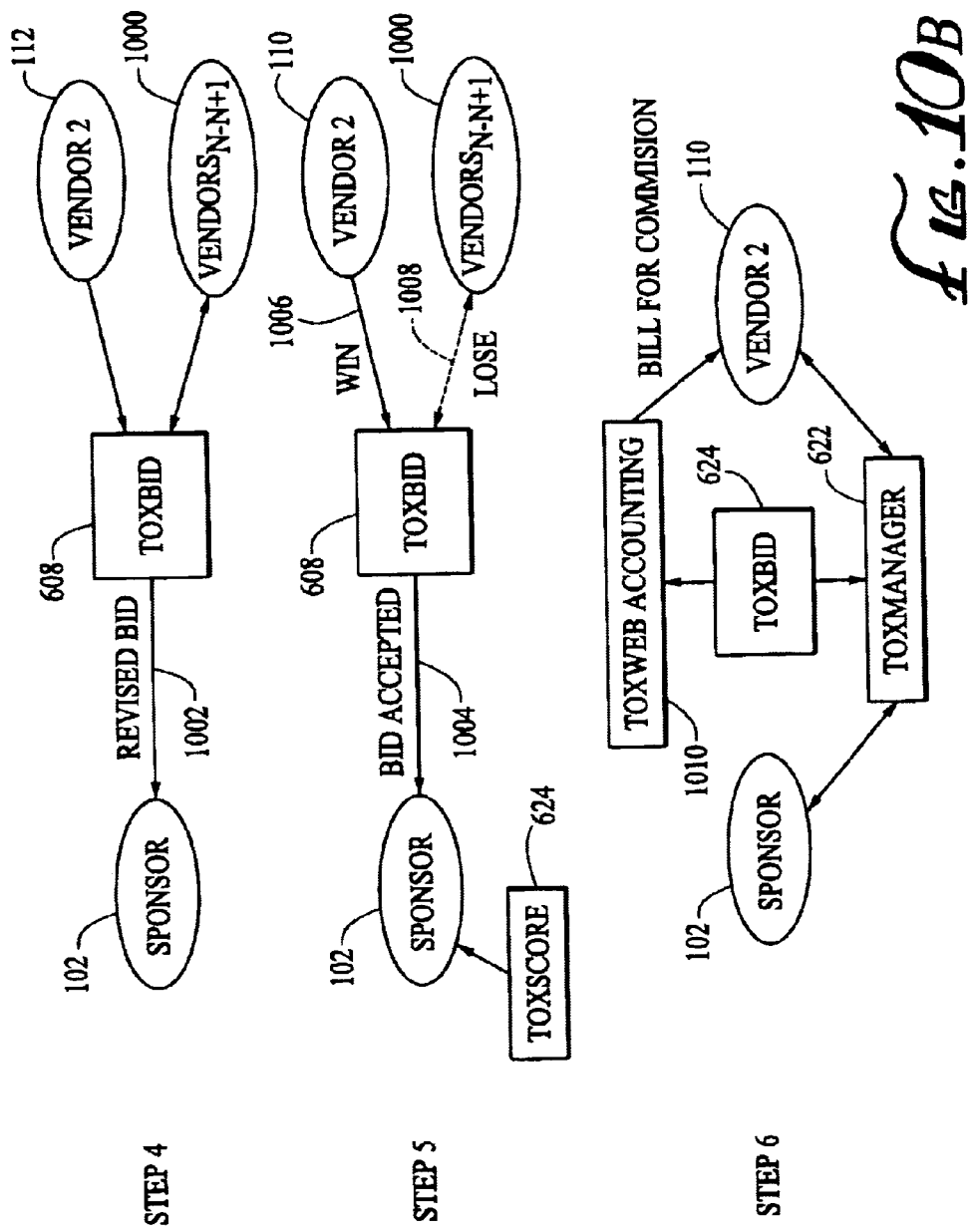

FIGS. 10A and 10B are a block diagram that graphically illustrates the steps performed by ToxBid™ 608 in accordance with an embodiment of the present invention. More specifically, FIGS. 10A and 10B show an oval that represents the study design specifications 604, a rectangle that represents ToxBid™ 608, and second oval that represents a RFQ 610. In an embodiment of the present invention, the study design specification 604 are produced by using ToxWizard™ 600. Indeed, those skilled in the art could recognize that producing the study design specification by using another technique does not exceed the scope of the present invention.

ToxBid™ 608 converts the study design specifications 604 into a RFQ 610. Next, ToxBid™ 608 compares the RFQ 610 with vendor capabilities. Namely, ToxBid™ 608 compares the RFQ 610 to the capabilities filter 612 and the sponsor's preference filter 614. The capabilities filter 612 contains the capabilities of each vendor 110, 112, and 114. The sponsor's preference filter 614 contains the sponsor's preferences for vendors. ToxScore™ 624 provides information to the sponsor's preference filter 614.

When a vendor 110, 112 and/or 114 satisfies the requirements of both the capabilities filter 612 and the sponsor's preference filter 614, ToxBid™ 608 sends an RFQ 610 to the vendor via a computer network 100 (shown in FIG. 1).

Next, the vendors 110, 112, and/or 114 send bids to ToxBid™ 608, and ToxBid™ 608 forwards the bids to the sponsor 102, as represented by the bid arrow 1000. It is noted that a vendor 110, 112 and/or 114 may revise a bid during an auction process. During the auction process, each vendor 110, 112 and/or 114 can view the bids of the other vendors, but vendors are prevented from viewing the identities of other vendors. A vendor usually revises a bid to make the bid competitive, relative to other bids. ToxBid™ 608 sends any revised bids to the sponsor 102, as represented by the revised bid arrow 1002. In an embodiment of the present invention, revised bid are prohibited. That is, ToxBid™ 608 receives a single blind bid—similar to a one bid auction.

Upon receipt of the bids, the sponsor 102 selects a winning bid. The sponsor may retrieve information from ToxScore™ 624 (shown in FIGS. 6A and 6B) when making the selection decision. The sponsor 102 then sends its selection to ToxBid™ 608, as represented by the bid accepted arrow 1004. ToxBid™ 608 then notifies the vendors, as represented by the win arrow 1006 and the lose arrow 1008.

ToxBid™ 208 also notifies the ToxManager™ 622 to open a project management account for the sponsor 102 and the winner vendor 110, 112 or 114 (i.e., the vendor that was selected by the user). ToxBid™ 208 further notifies ToxWeb™ 108 accounting 1010 to bill the vendor 110, 112, or 114 a study placement commission.

Figures 11, 11A:
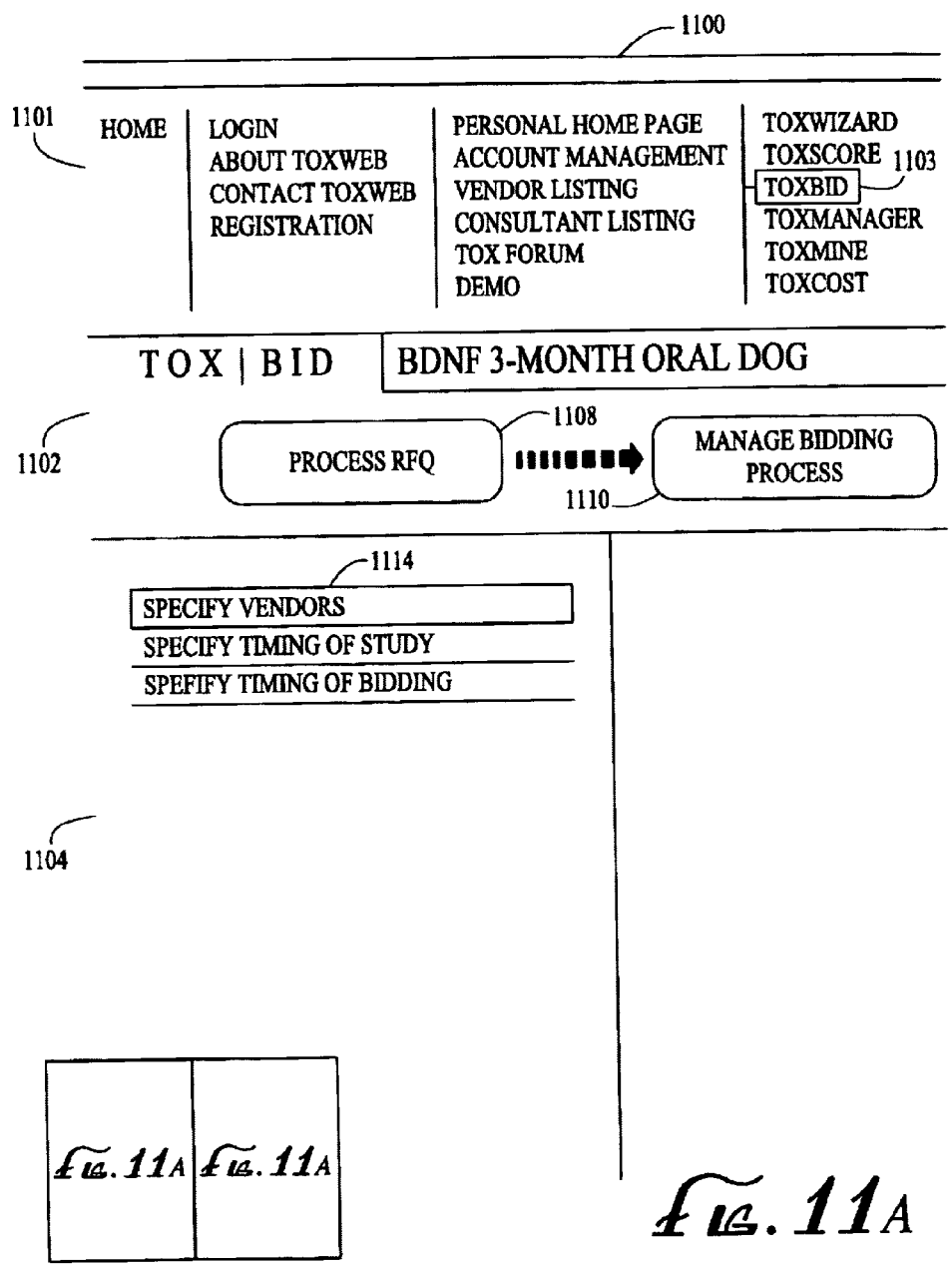

FIGS. 11A and 11B are a screenshot that illustrates the ToxBid™ GUI 1100 in accordance with an embodiment of the present invention. Similar to the ToxWizard™ GUI 800 (shown in FIGS. 8A and 8B), the ToxBid™ GUI 1100 has a TOC frame 1101 and three frames 1102, 1104, 1106. The top frame 1102 contains a menu of command buttons 1108, 1110, and 1112. The command buttons represent the functionality of ToxBid™ 608. In particular, the command button 1108 represents ToxBid™ 608 converting the study design specifications 604 into a RFQ 610. The command button 1110 represents ToxBid 608 managing/monitoring the bidding process. The command button 1112 represents ToxBid™ 608 completing the bidding process.

Selecting a button in the top frame 1102, affects the content of the left frame 1104. In particular, selecting the command button 1108 causes the ToxBid™ GUI 1100 to display decision choices that are related to the vendors.

Selecting a decision choice in the left frame affects the content of the right frame 1106. Namely, selecting the Specify Vendor menu item 1114 cause the ToxBid™ GUI 1100 to display a vendor listing 1116 in the right frame 1106. Like the ToxWizard™ GUI 800, the right frame 1106 contains an import command button 1118 and a save command button 1120.

Figure 12:
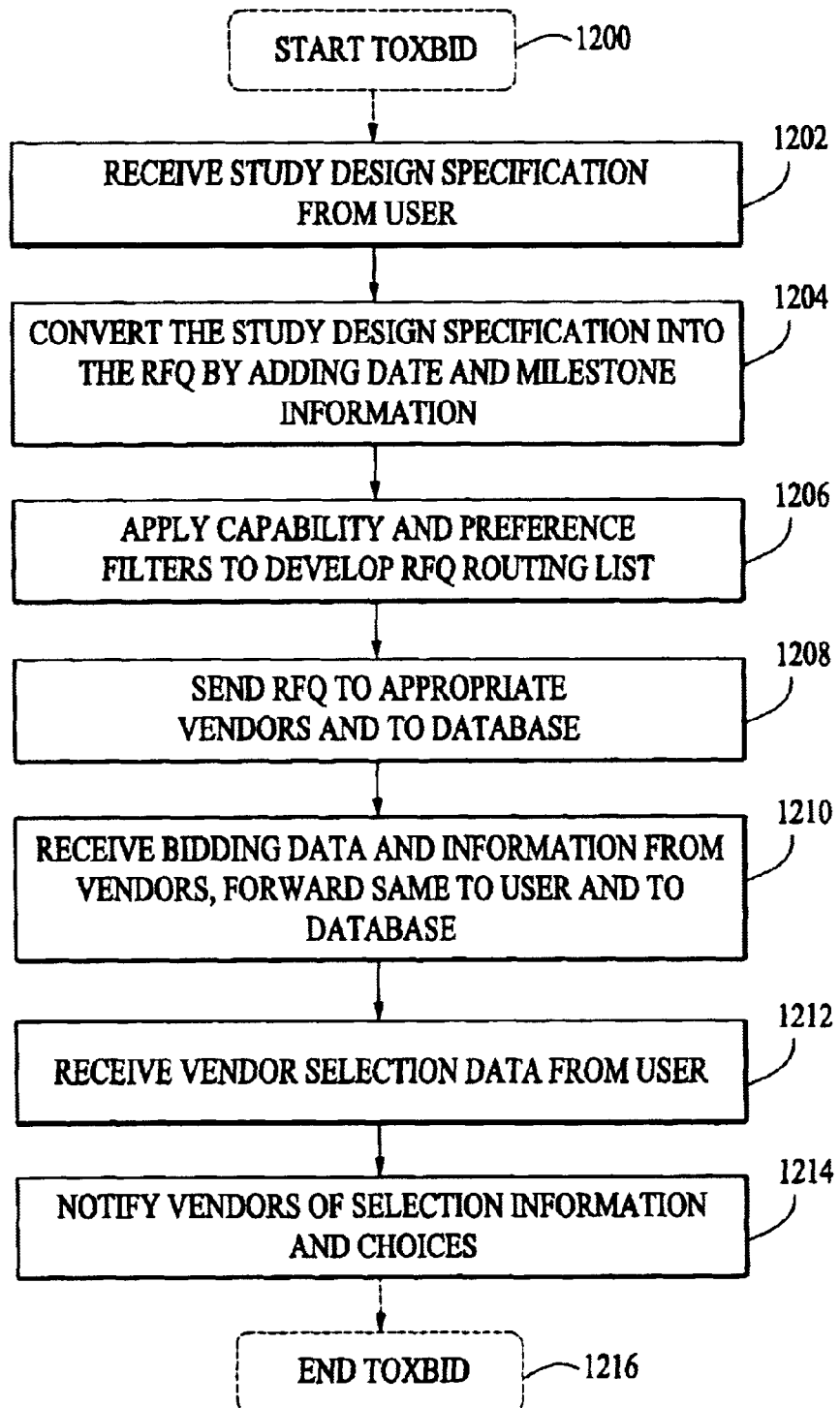
FIG. 12 is a flowchart that represents the steps performed when negotiating a bid in accordance with an embodiment of the present invention.

FIG. 12 is a flowchart that represents the steps performed when negotiating a bid in accordance with an embodiment of the present invention. Block 1200 represents ToxWeb™ 100 executing ToxBid™ 608 is response to a user's request. Block 1202 represents ToxBid™ 608 receiving the study design specifications 604 from a user. ToxBid™ 608 then converts the study design specifications 604 into a RFQ 210, as represented by block 1204. Next, ToxBid™ 608 applies the capability filter 612 and preference filter 614 to develop a RFQ routing list, as represented by block 1206.

Block 1208 represents ToxBid™ 608 sending a RFQ 610 to the appropriate vendors 110, 112, and/or 114 and to the ToxWeb™ database 106. Appropriate vendors satisfy both the capabilities filter 612 and the sponsor's preferences filter 614. ToxBid™ 608 then receives bidding data and information from vendors, and forwards the same to users, and to the ToxWeb™ database 106, as represented by block 1210.

Next, ToxBid™ 608 receives vendor selection data from the user, as represented by block 1212. Block 1214 represents ToxBid™ 608 notifying vendors of selection information and choices, as represented by block 1214. ToxBid™ also sends information to the ToxManager™ 622 and the ToxWeb™ Accounting ToxWeb™ accounting (shown in FIGS. 10A and 10B).

Study Management and Evaluation

After the vendor has been notified, a third advantageous feature of the present invention involves processing the communications, documents and information between the sponsor and the vendor. This feature is referred to herein as ToxManager™ 622 (shown in FIGS. 6A and 6B). The communications involve a near real-time exchange of administrative information and study data.

Figure 13B:
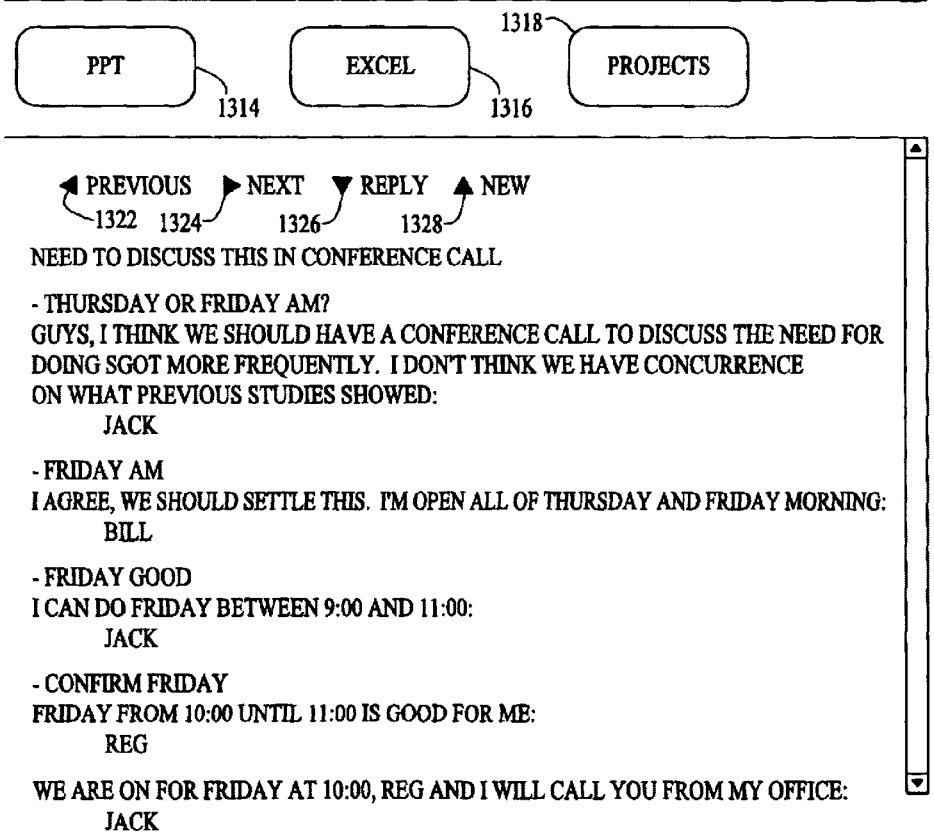

FIGS. 13A and 13B are an exemplary ToxManager™ GUI 1300. The ToxManager™ GUI 1300 has three frames: The top frame 1302 contains a menu of command buttons: dialog 1308, word 1310, access 1312, PPT 1314, excel 1316, projects 1318.

Selecting a command button in the top frame 1302, affects the content of the left frame 1304. In particular, choosing the dialog command button 1308 causes the ToxCost™ GUI 1300 to displays discussion items 1320.

Selecting a choice in the left frame 1304 affects the content of the right frame 1306. More specifically, selecting a particular discussion item causes the ToxManager™ GUI 1300 to display the contents of the discussion item file. It is noted that the ToxManager™ GUI 1300 displays a right pointing arrow 1322 and a left pointing arrow 1324, which allow a user to view the content of a previous or subsequent file, respectively. The ToxManager™ GUI 1300 also displays a down pointing arrow 1326 and an up pointing arrow 1328, which allow a user to reply to the displayed message or type in a new message, respectively.

Upon completion of a complex technical study, a fourth advantageous feature involves providing information about past vendor performance. This feature is referred to herein as ToxScore™ 624 (shown in FIGS. 6A and 6B). Sponsors 102 frequently experience difficulty in obtaining information about the quality of unfamiliar, potential vendors. ToxScore™ 624 provides this information. In particular, ToxScore™ 624 provides two types of information concerning vendor quality. The first type of information is objective information about vendor quality. The objective information includes, but is not limited to, quality audits by government regulatory agencies, professional society affiliations, and information concerning key personal (e.g., the identification of a vendor's principal scientists and officers).

The second type of information is subjective information about vendor quality. The subjective information includes, but is not limited to, comments provided by ToxWeb™ 108 customers. ToxWeb™ 108 customers include sponsors, vendors, and/or consultants that have previously participated in a complex technical study. After a study is completed, ToxScore™ 624 sends a survey to the sponsor of that study. The survey contains questions about a vendor's performance. The sponsor returns a completed survey, including answers to the questions about the vendor's performance. ToxScore™ 624 computes a vendor's overall score by averaging the received data. ToxScore™ 624 stores the vendor's overall score in a ToxScore™ database 626 (shown in FIGS. 6A and 6B). ToxScore™ 624 also sends the completed survey to the vendor.

The data contained in the ToxScore™ database 626 is available to all study participants. Sponsors can use the data to evaluate the performance of various vendors. It is noted that in an embodiment of the present invention the data does not include the individual surveys. Vendors can use the data to evaluate their comparative performance and to identify specific areas of improvement.

FIGS. 14A and 14B are a screenshot that shows the ToxScore™ GUI 1400 in accordance with an embodiment of the present invention. The ToxScore™ GUI 1400 has three frames. The top frame 1402 contains a menu of command buttons: View Scores 1408, View Surveys 1410, and Submit Survey 1412.

Selecting a command button 1408, 1410, and 1412 in the top frame 1402, affects the content of the left frame 1404. Specifically, choosing the View Scores command button 1408 causes the ToxScore™ GUI 1400 to display a vendor listing 1414.

Selecting a choice in the left frame 1404 affects the content of the right frame 1406. More specifically, selecting a particular vendor in the left frame 1404 causes the ToxScore™ GUI 1400 to display the information about the selected vendor 1416. It is noted that the vendor information includes survey results 1420, regulatory information 1422, and staff information 1424.

Collecting and Mining Data and Study Costs

A fifth advantageous feature of the present invention is technique for storing data about study designs, bids, and user information (referred to herein as ToxMine™). sponsors and vendors members can obtain this information.

FIGS. 15A and 15B are an exemplary ToxMine™ GUI 1500. The ToxMine™ GUI 1500 has three frames. The top frame 1502 contains a menu of command buttons: Output Type 1508, First Selection Parameter 1510, Second Selection Parameter 1512, timing selection 1514, and plot and save 1516.

Selecting a command button in the top frame 1502, affects the content of the left frame 1504. In particular, choosing the Output Type command button 1508 causes the ToxMine™ GUI 1500 to display Select Chart Type 1518 and Select Output Units 1520. It is noted that for this particular case, the right frame is empty, except for the Import Command button 1522, the Save Command button 1524, and the Reset Command button 1526.

A sixth advantageous feature of the present invention is a process of collecting pricing information for a complex technical study. The process is referred to herein as ToxCost™. ToxCost™ matches the study design specifications 604 (shown in FIGS. 6A and 6B) with the pricing information of past technical studies. ToxCost™ receives the pricing information from ToxBid™ 608 (shown in FIGS. 6A and 6B) during the bidding process.

Sponsors 102 (shown in FIGS. 6A and 6B) and vendors 110, 112, and 114 (shown in FIGS. 6A and 6B) can access the ToxCost™ database 618 for three different purposes. The first purpose involves obtaining data about a technical study for budgeting estimates. For this purpose, the study specifics may be undetermined. The technique for accessing budgeting estimate information involves a user (either a sponsor 102 or a vendor 110, 112, and 114) querying the ToxCost™ database 618 (via ToxCost™) for pricing information concerning general study types, e.g., a three month oral dog study.

Upon receipt of the query, ToxCost™ performs mathematical and computational manipulations upon the pricing information for all past studies that uses dogs for three months of oral delivery. ToxCost™ then returns a cost estimate of such studies. This cost estimate is within a sufficient precision for budgeting purposes.

The second purpose for obtaining pricing information about past studies is related to competitive benchmarking. Competitive benchmarking requires estimates that have greater precision than the budgeting estimates. This greater precision allows users to differentiate between competitors.

To provide price information on a very specific study design, ToxCost™ uses the study design specifications 604. The study design specification 604 is used to query the ToxCost™ database 618 about past studies having matching design specifications. ToxCost™ then averages the pricing information of all of the past studies having matching design specifications. ToxCost™ returns this average to the user.

A third purpose for obtaining pricing information about past studies is related to evaluating cost drivers. The technique for obtaining this data involves a user querying the ToxCost™ database 618 for pricing information about cost drivers. In response, ToxCost™ performs a computational analysis that determines the mean a value of each cost driver. For example, given a sufficient number of studies using rats, each with variable designs and cost, ToxCost™ extrapolates the mean cost of a rat. This cost driver information assists vendors 110, 112, and 114 in identifying their competitive strengths and weaknesses. In the past, this type of information has been either unavailable or difficult to obtain.

FIGS. 16A and 16B are an exemplary ToxCost™ GUI 1600. The ToxCost™ GUI 1600 has three frames. The top frame 1602 contains a menu of command buttons 1608, 1610, and 1612. The command buttons represent the following decision choices: Select Overall Study Type 1608, Select Cost Parameters 1610 and Select Output Type 1612.

Selecting a command button 1608, 1610, 1612 in the top frame 1602, affects the content of the left frame 1604. In particular, choosing the Select Overall Study Type command button 1614 causes the ToxCost™ GUI 1600 to display choices related to the Overall Study Type 1614.

Selecting a choice in the left frame 1604 affects the content of the right frame 1606. More specifically, selecting General 1616 causes the ToxCost™ GUI 1600 to display the following choices: Duration 1618, Route 1620 and Species 1622. Similarly to the ToxWizard™ GUI 800 (shown in FIGS. 8A and 8B), the right frame 1606 has an Import command button 1624, a Save command button 1626, and a Reset command button 1628.

Although the invention has been described in detail with reference only to the presently preferred method, apparatus, and article of manufacture, those of ordinary skill in the art will appreciate that various modifications can be made without departing from the invention. Accordingly, the invention is defined only by the following claims.

What is claimed:

1. A method of creating a decision tree for use with a technical study design specification, wherein the technical study design specification is based on toxicology studies, comprising:

at a computer,
 (a) identifying a plurality of possible parameters that can be used to objectively describe the technical study;
 (b) developing one or more hierarchical and causal relationships between the parameters by using expert knowledge;
 (c) assigning each parameter to one or more interdependent decision nodes, and
 (d) ordering the interdependent decision nodes in a hierarchical manner, such that a decision choice at one node dynamically and functionally determines the manner in which a subsequent decision choice is affected at a subsequent node.

2. A method of creating a decision tree for use with a technical study design specification, wherein the technical study design specification is based on a pharmaceutical drug research, development and commercialization activity, comprising:

at a computer,
 (a) identifying a plurality of possible parameters that can be used to objectively describe the technical study;
 (b) developing one or more hierarchical and causal relationships between the parameters by using expert knowledge;
 (c) assigning each parameter to one or more interdependent decision nodes; and
 (d) ordering the interdependent decision nodes in a hierarchical manner, such that a decision choice at one node dynamically and functionally determines the manner in which a subsequent decision choice is affected at a subsequent node.

3. A method of using a decision tree to generate a technical study design specification, comprising:

at a computer,
 (a) storing the decision tree, wherein the decision tree includes at least two interdependent nodes, and wherein each interdependent node represents a different aspect of the technical study;
 (b) transmitting the decision tree or its functional representation to a client computer;
 (c) for one of the interdependent nodes of the decision tree, displaying the interdependent node on a monitor that is attached to the client computer, wherein displaying the interdependent node comprises displaying one or more possible choices for that interdependent node;
 (d) receiving at least one user-specified choice, wherein the user-specified choice is a subset of the displayed choices;
 (e) based on the received user-specified choices, dynamically and functionally affecting a pre-defined number of possible choices from any other interdependent nodes; and
 (f) continuing steps (b)–(f) until the possible choices for each node have been displayed on the monitor.

4. The method of claim 3, further comprising:
before step (a), at a computer, creating the decision tree by:
 (i) identifying a plurality of possible parameters that can be used to objectively describe the technical study;
 (ii) developing one or more hierarchical and causal relationships between the parameters by using expert knowledge;
 (iii) assigning each parameter to an interdependent decision node; and
 (iv) ordering the interdependent decision nodes in a hierarchical manner, such that a decision choice at one node dynamically and functionally determines the manner in which a subsequent decision choice is affected.

5. The method of claim 3, wherein the decision tree is a menudriven system that allows a user to select from two or more menu choices.

6. The method of claim 3, wherein the decision tree comprises a combination of a menu-driven system and a command-driven system, this combination allows a user to select from two or more menu choices, and the combination allows the user to enter at least one user-defined choice.

7. The method of claim 3, wherein the decision tree is a command-driven system that allows a user to enter one or more user-defined choices.

8. The method of claim 3, further comprising, at a computer, transmitting the user-specified choices for each node to a database that is stored on a data storage device which is connected to the computer.

9. The method of claim 3, wherein the technical study design specification is based on a complex technical study.

10. The method of claim 3, wherein the technical study design specification is based on a toxicology study.

11. The method of claim 3, wherein the technical study design specification is based on a pharmaceutical drug research, development and commercialization study.

12. The method of claim 3, wherein the technical study design specification is based on any sequence of objectively defined procedures or conditions.

13. A method of using a decision tree to generate a technical study design specification, comprising:
at a computer,
(a) creating a decision tree by,
(i) identifying a plurality of possible parameters that can be used to objectively describe the technical study;
(ii) developing hierarchical and causal relationships between the parameters by using expert knowledge;
(iii) assigning each parameter to an interdependent decision node;
(iv) ordering the interdependent decision nodes in a hierarchical manner, such that a decision choice at one node dynamically and functionally affects the decision choice at a subsequent node;
(b) storing the decision tree;
(c) transmitting the decision tree to a client computer;
(d) for one of the interdependent nodes of the decision tree, displaying the interdependent node on a monitor that is attached to the client computer, wherein displaying the interdependent node comprises displaying one or more possible choices for that interdependent node;
(e) receiving at least one user-specified choice, wherein the user-specified choice is a subset of the displayed choices;
(f) based on the received user-specified choices, dynamically and functionally affecting a pre-defined number of possible choices from any other interdependent nodes; and
(g) continuing steps (c)–(g) until the possible choices for each node have been displayed on the monitor.

14. The method of claim 13, wherein the decision tree is a menudriven system that allows a user to select from two or more menu choices.

15. The method of claim 13, wherein the decision tree comprises a combination of a menu-driven system and a command-driven system, this combination allows a user to select from two or more menu choices, and the combination allows the user to enter at least one user-defined choice.

16. The method of claim 13, wherein the decision tree is a command-driven system that allows a user to enter one or more user-defined choices.

17. The method of claim 13, further comprising, at a computer, transmitting the user-specified choices for each node to a database that is stored on a data storage device which is connected to the computer.

18. The method of claim 13, wherein the technical study design specification is based on a complex technical study.

19. The method of claim 13, wherein the technical study design specification is based on a toxicology study.

20. The method of claim 13, wherein the technical study design specification is based on a pharmaceutical drug technical and development and commercialization study.

21. The method of claim 13, wherein the technical study design specification is based on any sequence of objectively defined procedures or conditions.

22. An apparatus for creating a decision tree for use with a technical study design specification, wherein the technical study design specification is based on toxicology studies, comprising:
a computer; and
a computer program, performed by the computer, that (a) identifies a plurality of possible parameters that can be used to objectively describe the technical study, (b) develops one or more hierarchical and causal relationships between the parameters by using expert knowledge, (c) assigns each parameter to one or more interdependent decision nodes, and (d) orders the interdependent decision nodes in a hierarchical manner, such that a decision choice at one node dynamically and functionally determines the manner in which a subsequent decision choice is affected at a subsequent node.

23. An apparatus for creating a decision tree for use with a technical study design specification, wherein the technical study design specification is based on a pharmaceutical drug research, development and commercialization activity, comprising:
a computer; and
a computer program, performed by the computer, that (a) identifies a plurality of possible parameters that can be used to objectively describe the technical study, (b) develops one or more hierarchical and causal relationships between the parameters by using expert knowledge, (c) assigns each parameter to one or more interdependent decision nodes, and (d) orders the interdependent decision nodes in a hierarchical manner, such that a decision choice at one node dynamically and functionally determines the manner in which a subsequent decision choice is affected at a subsequent node.

24. An apparatus for using a decision tree to generate a technical study design specification, comprising:
a computer; and
a computer program, performed by the computer, that (a) stores the decision tree, wherein the decision tree includes at least two interdependent nodes, and wherein each interdependent node represents a different aspect of the technical study, (b) transmits the decision tree or its functional representation to a client computer, (c) for one of the interdependent nodes of the decision tree, displays the interdependent node on a monitor that is attached to the client computer, wherein displaying the interdependent node comprises displaying one or more possible choices for that interdependent node, (d) receives at least one user-specified choice, wherein the user-specified choice is a subset of the displayed choices, (e) based on the received user-specified choices, dynamically and functionally affects a pre-defined number of possible choices from any other interdependent nodes, and (f) continues steps (b)–(f) until the possible choices for each node have been displayed on the monitor.

25. The apparatus of claim 24, further comprising:
a computer program, performed by the computer, that, before step (a), creates the decision tree by (i) identifying a plurality of possible parameters that can be used to objectively describe the technical study, (ii) developing one or more hierarchical and causal relationships between the parameters by using expert knowledge, (iii) assigning each parameter to an interdependent decision node, and (iv) ordering the interdependent decision nodes in a hierarchical manner, such that a decision choice at one node dynamically and functionally determines the manner in which a subsequent decision choice is affected.

26. The apparatus of claim 24, wherein the decision tree is a menu-driven system that allows a user to select from two or more menu choices.

27. The apparatus of claim 24, wherein the decision tree comprises a combination of a menu-driven system and a command-driven system, this combination allows a user to select from two or more menu choices, and the combination allows the user to enter at least one user-defined choice.

28. The apparatus of claim 24, wherein the decision tree is a command-driven system that allows a user to enter one or more user-defined choices.

29. The apparatus of claim 24, further comprising, a computer program, performed by the computer, that transmits the user-specified choices for each node to a database that is stored on a data storage device which is connected to the computer.

30. The apparatus of claim 24, wherein the technical study design specification is based on a complex technical study.

31. The apparatus of claim 24, wherein the technical study design specification is based on a toxicology study.

32. The apparatus of claim 24, wherein the technical study design specification is based on a pharmaceutical drug research, development and commercialization study.

33. The apparatus of claim 24, wherein the technical study design specification is based on any sequence of objectively defined procedures or conditions.

34. An apparatus for using a decision tree to generate a technical study design specification, comprising:
    a computer;
    a computer program, performed by the computer, that creates a decision tree by (a) identifying a plurality of possible parameters that can be used to objectively describe the technical study, (b) developing hierarchical and causal relationships between the parameters by using expert knowledge, (c) assigning each parameter to an interdependent decision node, (d) ordering the interdependent decision nodes in a hierarchical manner, such that a decision choice at one node dynamically and functionally affects the decision choice at a subsequent node; and
    a computer program, performed by the computer, that (a) stores the decision tree, (b) transmits the decision tree to a client computer, (c) for one of the interdependent nodes of the decision tree, displays the interdependent node on a monitor that is attached to the client computer, wherein displaying the interdependent node comprises displaying one or more possible choices for that interdependent node, (d) receives at least one user-specified choice, wherein the user-specified requirement is a subset of the displayed choices, (e) based on the received user-specified choices, dynamically and functionally affects a pre-defined number of possible choices from any other interdependent nodes, and (f) continues steps (b)–(f) until the possible choices for each node have been displayed on the monitor.

35. The apparatus of claim 34, wherein the decision tree is a menu-driven system that allows a user to select from two or more menu choices.

36. The apparatus of claim 34, wherein the decision tree comprises a combination of a menu-driven system and a command-driven system, this combination allows a user to select from two or more menu choices, and the combination allows the user to enter at least one user-defined choice.

37. The apparatus of claim 34, wherein the decision tree is a command-driven system that allows a user to enter one or more user-defined choices.

38. The apparatus of claim 34, further comprising, at a computer, transmitting the user-specified choices for each node to a database that is stored on a data storage device which is connected to the computer.

39. The apparatus of claim 34, wherein the technical study design specification is based on a complex technical study.

40. The apparatus of claim 34, wherein the technical study design specification is based on a toxicology study.

41. The apparatus of claim 34, wherein the technical study design specification is based on a pharmaceutical drug technical and development and commercialization study.

42. The apparatus of claim 34, wherein the technical study design specification is based on any sequence of objectively defined procedures or conditions.

43. An article of manufacture comprising a computer program carrier readable by a computer and embodying one or more instructions executable by the computer to perform the method of creating a decision tree for use with a technical study design specification, wherein the technical study design specification is based on toxicology studies, comprising:
    at a computer,
        (a) identifying a plurality of possible parameters that can be used to objectively describe the technical study;
        (b) developing one or more hierarchical and causal relationships between the parameters by using expert knowledge;
        (c) assigning each parameter to one or more interdependent decision nodes; and
        (d) ordering the interdependent decision nodes in a hierarchical manner, such that a decision choice at one node dynamically and functionally determines the manner in which a subsequent decision choice is affected at a subsequent node.

44. An article of manufacture comprising a computer program carrier readable by a computer and embodying one or more instructions executable by the computer to perform the method of creating a decision tree for use with a technical study design specification, wherein the technical study design specification is based on a pharmaceutical drug research, development and commercialization activity, comprising:
    at a computer,
        (a) identifying a plurality of possible parameters that can be used to objectively describe the technical study;
        (b) developing one or more hierarchical and causal relationships between the parameters by using expert knowledge;
        (c) assigning each parameter to one or more interdependent decision nodes; and
        (d) ordering the interdependent decision nodes in a hierarchical manner, such that a decision choice at one node dynamically and functionally determines the manner in which a subsequent decision choice is affected at a subsequent node.

45. An article of manufacture comprising a computer program carrier readable by a computer and embodying one or more instructions executable by the computer to perform the method of using a decision tree to generate a technical study design specification, comprising:
    at a computer,
        (a) storing the decision tree, wherein the decision tree includes at least two interdependent nodes, and wherein each interdependent node represents a different aspect of the technical study;
        (b) transmitting the decision tree or its functional representation to a client computer;
        (c) for one of the interdependent nodes of the decision tree, displaying the interdependent node on a monitor that is attached to the client computer, wherein displaying the interdependent node comprises displaying one or more possible choices for that interdependent node;

(d) receiving at least one user-specified choice, wherein the user-specified choice is a subset of the displayed choices;

(e) based on the received user-specified choices, dynamically and functionally affecting a pre-defined number of possible choices from any other interdependent nodes; and (f) continuing steps (b)–(f) until the possible choices for each node have been displayed on the monitor.

46. The article of manufacture of claim 45, further comprising:

before step (a), at a computer, creating the decision tree by:
(i) identifying a plurality of possible parameters that can be used to objectively describe the technical study;
(ii) developing one or more hierarchical and causal relationships between the parameters by using expert knowledge;
(iii) assigning each parameter to an interdependent decision node; and
(iv) ordering the interdependent decision nodes in a hierarchical manner, such that a decision choice at one node functionally determines the manner in which a subsequent decision choice is affected.

47. The article of manufacture of claim 45, wherein the decision tree is a menu-driven system that allows a user to select from two or more menu choices.

48. The article of manufacture of claim 45, wherein the decision tree comprises a combination of a menu-driven system and a command-driven system, this combination allows a user to select from two or more menu choices, and the combination allows the user to enter at least one user-defined choice.

49. The article of manufacture of claim 45, wherein the decision tree is a command-driven system that allows a user to enter one or more user-defined choices.

50. The article of manufacture of claim 45, further comprising, at a computer, transmitting the user-specified choices for each node to a database that is stored on a data storage device which is connected to the computer.

51. The article of manufacture of claim 45, wherein the technical study design specification is based on a complex technical study.

52. The article of manufacture of claim 45, wherein the technical study design specification is based on a toxicology study.

53. The article of manufacture of claim 45, wherein the technical study design specification is based on a pharmaceutical drug research, development and commercialization study.

54. The article of manufacture of claim 45, wherein the technical study design specification is based on any sequence of objectively defined procedures or conditions.

55. An article of manufacture comprising a computer program carrier readable by a computer and embodying one or more instructions executable by the computer to perform the method of using a decision tree to generate a technical study design specification, comprising:

at a computer,
(a) creating a decision tree by,
(i) identifying a plurality of possible parameters that can be used to objectively describe the technical study;
(ii) developing hierarchical and causal relationships between the parameters by using expert knowledge;
(iii) assigning each parameter to an interdependent decision node;
(iv) ordering the interdependent decision nodes in a hierarchical manner, such that a decision choice at one node dynamically and functionally affects the decision choice at a subsequent node;

(b) storing the decision tree;

(c) transmitting the decision tree to a client computer;

(d) for one of the interdependent nodes of the decision tree, displaying the interdependent node on a monitor that is attached to the client computer, wherein displaying the interdependent node comprises displaying one or more possible choices for that interdependent node;

(e) receiving at least one user-specified choice, wherein the user-specified choice is a subset of the displayed choices;

(f) based on the received user-specified choices, dynamically and functionally affecting a pre-defined number of possible choices from any other interdependent nodes; and (g) continuing steps (c)–(g) until the possible choices for each node have been displayed on the monitor.

56. The article of manufacture of claim 55, wherein the decision tree is a menu-driven system that allows a user to select from two or more menu choices.

57. The article of manufacture of claim 55, wherein the decision tree comprises a combination of a menu-driven system and a command-driven system, this combination allows a user to select from two or more menu choices, and the combination allows the user to enter at least one user-defined choice.

58. The article of manufacture of claim 55, wherein the decision tree is a command-driven system that allows a user to enter one or more user-defined choices.

59. The article of manufacture of claim 55, further comprising, at a computer, transmitting the user-specified choices for each node to a database that is stored on a data storage device which is connected to the computer.

60. The article of manufacture of claim 55, wherein the technical study design specification is based on a complex technical study.

61. The article of manufacture of claim 55, wherein the technical study design specification is based on a toxicology study.

62. The article of manufacture of claim 55, wherein the technical study design specification is based on a pharmaceutical drug technical and development and commercialization study.

63. The article of manufacture of claim 55, wherein the technical study design specification is based on any sequence of objectively defined procedures or conditions.

* * * * *